United States Patent
Tanaka et al.

(10) Patent No.: US 9,311,012 B2
(45) Date of Patent: Apr. 12, 2016

(54) STORAGE SYSTEM AND METHOD FOR MIGRATING THE SAME

(71) Applicant: Hitachi, Ltd., Tokyo (JP)

(72) Inventors: Daisuke Tanaka, Tokyo (JP); Keishi Tamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/424,174

(22) PCT Filed: Feb. 19, 2014

(86) PCT No.: PCT/JP2014/053829
§ 371 (c)(1),
(2) Date: Feb. 26, 2015

(87) PCT Pub. No.: WO2015/125221
PCT Pub. Date: Aug. 27, 2015

(65) Prior Publication Data
US 2016/0026409 A1    Jan. 28, 2016

(51) Int. Cl.
*G06F 12/00* (2006.01)
*G06F 3/06* (2006.01)
*G06F 12/08* (2006.01)

(52) U.S. Cl.
CPC .............. *G06F 3/0647* (2013.01); *G06F 3/067* (2013.01); *G06F 3/0617* (2013.01); *G06F 12/0842* (2013.01); *G06F 12/0891* (2013.01); *G06F 2212/1016* (2013.01); *G06F 2212/154* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 7,702,851 B2 | 4/2010 | Satoyama et al. | |
| 2007/0271434 A1 | 11/2007 | Kawamura et al. | |
| 2008/0109615 A1* | 5/2008 | Morishita et al. | G06F 3/0605 711/154 |
| 2009/0055586 A1 | 2/2009 | Kawamura et al. | |
| 2011/0060944 A1 | 3/2011 | Kawamura et al. | |
| 2011/0296101 A1 | 12/2011 | Kawamura et al. | |
| 2012/0203963 A1 | 8/2012 | Kawamura et al. | |
| 2013/0159651 A1* | 6/2013 | Eguchi et al. | G06F 3/061 711/162 |
| 2013/0212335 A1* | 8/2013 | Teranishi et al. | G06F 12/08 711/138 |

FOREIGN PATENT DOCUMENTS

| | | |
|---|---|---|
| JP | 2007-115221 A | 5/2007 |
| JP | 2007-310495 A | 11/2007 |
| JP | 2008-117253 A | 5/2008 |

* cited by examiner

*Primary Examiner* — Kaushikkumar Patel
(74) *Attorney, Agent, or Firm* — Volpe and Koenig, P.C.

(57) ABSTRACT

The present invention provides a storage system capable of performing data migration without stopping the IO access from a host computer, without having to copy data in an external connection storage subsystem to a migration destination storage subsystem. A configuration information of a migration source volume in a migration source storage subsystem is migrated to the migration destination storage subsystem, and during migration, cache memories of the respective subsystems are used to duplicate and store write data from the host computer, and the migration destination storage subsystem reflects the write data to the external connection storage subsystem. Reading of data is also performed by the migration destination storage subsystem.

14 Claims, 23 Drawing Sheets

Fig. 4

| PATH NUMBER | LUN# | STORAGE SUBSYSTEM IDENTIFIER | IDENTICAL DEVICE CORRESPONDENCE IDENTIFIER |
|---|---|---|---|
| 0 | 0 | H MODEL A | Device_a |
| 1 | 10 | H MODEL A | Device_b |
| 2 | 0 | H MODEL A | Device_a |
| 3 | 200 | H MODEL B | Device_a |
| ... | ... | ... | ... |

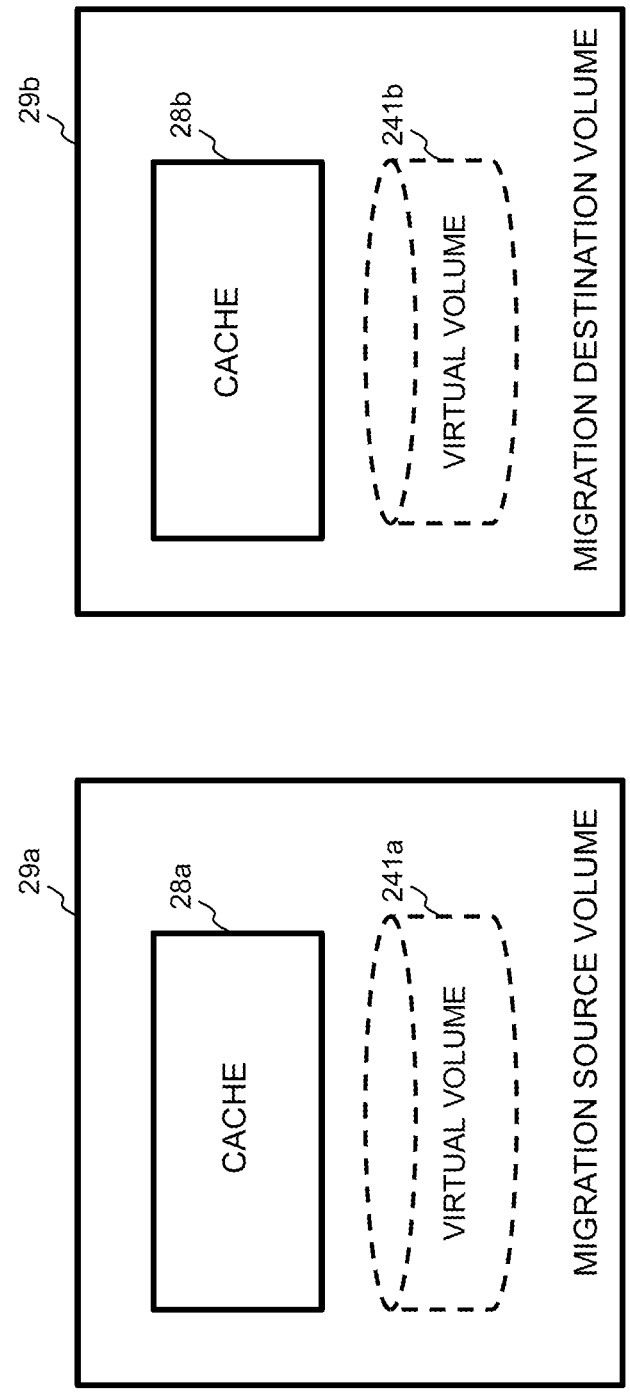

Fig. 6

| # | VIRTUAL LDEV | MIGRATION SOURCE LUN | MIGRATION SOURCE STORAGE SUBSYSTEM CONNECTION PATH INFORMATION | EXTERNAL CONNECTION STORAGE SUBSYSTEM | EXTERNAL STORAGE SUBSYSTEM LUN | EXTERNAL STORAGE SUBSYSTEM CONNECTION PATH INFORMATION | EXTERNAL STORAGE SUBSYSTEM PATH STATUS |
|---|---|---|---|---|---|---|---|
| 1 | 10:00 | 0x0 | 1A | STORAGE MANUFACTURED BY A | 4 | 2A | OFFLINE |
| 2 | 10:10 | 0x1 | 1A | STORAGE MANUFACTURED BY A | 5 | 2A | ONLINE |
| 3 | 20:00 | 0x2 | 2B | STORAGE MANUFACTURED BY A | 6 | 4B | ONLINE |
| ... | ... | ... | ... | ... | ... | ... | |
| n | F0:12 | 0xFF | 8A | STORAGE MANUFACTURED BY A | 0xFF | 9C | OFFLINE |

STORAGE SYSTEM AND METHOD FOR MIGRATING THE SAME

TECHNICAL FIELD

The present invention relates to a storage system and a method for migrating the same.

BACKGROUND ART

Recently, in the field of storage systems, a concept to operate multiple dispersed computing resources virtually as a single resource is attracting attention. One form for realizing such system is a configuration where multiple storage subsystems are collectively gathered and handled as a single system. For example, Patent Literature 1 teaches a configuration in which a storage subsystem is connected to a host computer and an external connection storage subsystem (hereinafter referred to as external storage) is further connected to the storage subsystem, wherein the whole configuration is considered as a single system.

This technique relates to connecting an external storage subsystem to a migration source storage subsystem (old model), and migrating volumes of the external storage subsystem to a migration destination storage subsystem (new model). Then, during migration, when the migration source storage subsystem receives a write request from the host computer, the migration source storage subsystem transfers the write data directly to the external storage subsystem without storing the data in the cache of the migration source storage subsystem. Further, when the migration destination storage subsystem receives a write request from the host computer, the write request is transferred to the migration source storage subsystem. As described, data is migrated from the old model storage subsystem to the new model storage subsystem including an external connection volume provided by the external storage subsystem without having to stop data transfer performed in response to an I/O request from the host computer.

CITATION LIST

Patent Literature

[PTL 1] Japanese Patent Application Laid-Open Publication No. 2007-115221 (U.S. Pat. No. 7,702,851)

SUMMARY OF INVENTION

Technical Problem

According to the prior art technique, in order to migrate the environment of an external connection volume composed of a migration source storage subsystem and an external storage subsystem to a migration destination storage subsystem, it was necessary to create an internal volume in the migration destination storage subsystem and to perform data migration temporarily to the internal volume of the contents of the external connection volume to be migrated. Then, it was necessary to perform a copy processing to an external connection volume newly mapped to the host computer in the migration destination storage subsystem. In order to perform such process, it was necessary to prepare the same number of internal volumes having the same capacity as the volumes being migrated, and the data copying process had to be performed twice, from the external storage subsystem to the migration destination storage subsystem and from the migration destination storage subsystem to the external storage subsystem, so that migration time is elongated and the response performance during migration is deteriorated.

Solution to Problem

In order to solve the problems of the prior art mentioned above, the present invention provides a storage system comprising a migration source storage subsystem, a migration destination storage subsystem and an external storage subsystem, wherein the storage system has a host computer and a management device connected thereto; the migration source storage subsystem includes a migration source cache memory, which is associated with an external volume composed of a storage device of an external storage subsystem and provided virtually to the host computer as a migration source volume; the migration destination storage subsystem includes a migration destination cache memory; wherein based on a data migration instruction output by the management device from the migration source storage subsystem to the migration destination storage subsystem; the storage system associates and allocates the migration source volume to the migration destination storage subsystem as a migration destination volume; associates the migration destination volume to the external volume and virtually provides the same to the host computer; based on a purge command to the migration source cache memory, deletes stored data after reflecting the stored data to the external volume; after completing the purge command, restricts the access from the host computer to the external volume to pass through the migration destination storage; when a data write command is output from the host computer to the migration destination volume, stores a write data in the migration destination cache memory and the external volume, and also transfers the same to the migration source cache memory for storage therein; and performs data migration of a system configuration in the migration source storage subsystem to a system configuration in the migration destination storage subsystem.

Further, when failure of the migration destination storage subsystem is detected during data migration by an IO access from the host computer, a path connection in cancelled state between the host computer and the migration source storage subsystem is reconnected and the IO access is continued.

Advantageous Effects of Invention

According to the storage subsystem of the present invention, data copying process becomes unnecessary, migration time is shortened, and consumption of storage resources can be prevented. According further to the storage subsystem of the present invention, cache is duplicated, so that even when failure occurs to the migration destination storage subsystem, IO access can be processed continuously by immediately switching a path to the path leading to the migration source storage subsystem. The problems, configuration and effects other than those described above will become apparent by the following description of preferred embodiments.

BRIEF DESCRIPTION OF DRAWINGS

FIG. 4 is a view illustrating a configuration example of an identical device correspondence table.

FIG. 5 is a view illustrating the relationship between cache and virtual volume in a migration source volume and a migration destination volume.

FIG. 6 is a view illustrating a configuration example of a volume migration management table.

DESCRIPTION OF EMBODIMENTS

Figure 1:
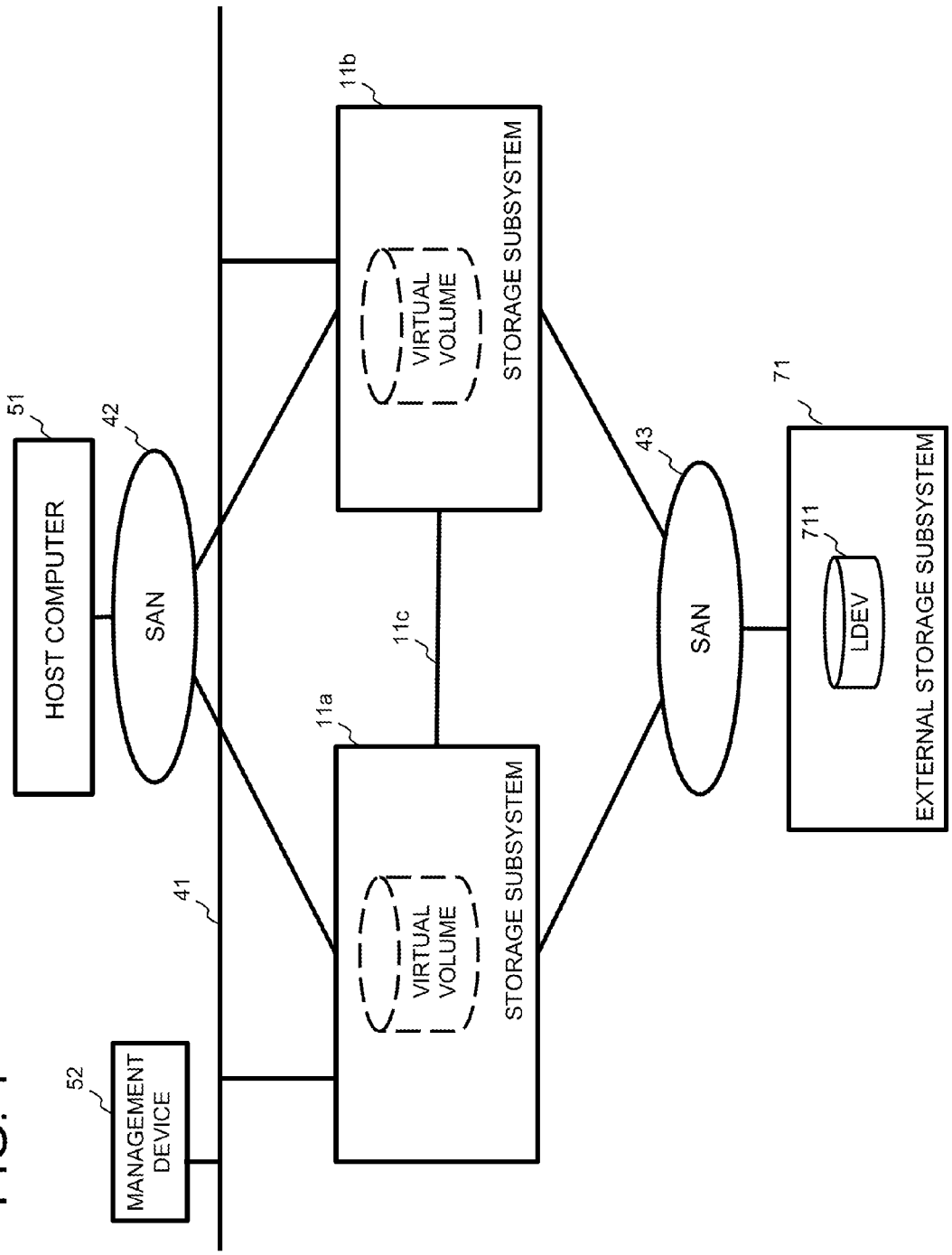
FIG. 1 is a view illustrating a basic configuration of a computer system.

Now, the preferred embodiments of the present invention will be described with reference to the drawings. In the following description, various information are referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer programs can be installed to each computer from a program source. The program source can be provided via a program assignment server or storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one, unless defined otherwise.

Embodiment 1

<System Configuration>

FIG. 1 is a view illustrating a basic configuration of a computer system. The computer system includes a host computer 51, a management device 52, multiple storage subsystems 11 (11a, 11b) and an external storage subsystem 71. The host computer 51 connects via a SAN (Storage Area Network) 42 to the storage subsystem 11a and the storage subsystem 11b.

The external storage subsystem 71 connects via a SAN 43 to the storage subsystems 11a and 11b. Using multiple HDDs (Hard Disk Drives), the external storage subsystem 71 provides one or more storage volumes, in other words, a logical device (LDEV) 711 (hereinafter referred to as an external volume 711) to the storage subsystem 11a or the storage subsystem 11b, and the storage subsystems 11a or 11b provides the same as a virtual volume to the host computer 51.

Further, the management device 52 connects to the storage subsystems 11a and 11b via a LAN (Local Area Network), so as to monitor and manage the operation status or the like of the storage subsystems 11. Further, the storage subsystem 11a and the storage subsystem 11b are connected via a dedicated line. In the present embodiment, the storage subsystem 11a is set as a migration source storage subsystem, and the storage subsystem 11b is set as a migration destination storage subsystem.

<Hardware Configuration>

Figure 2:
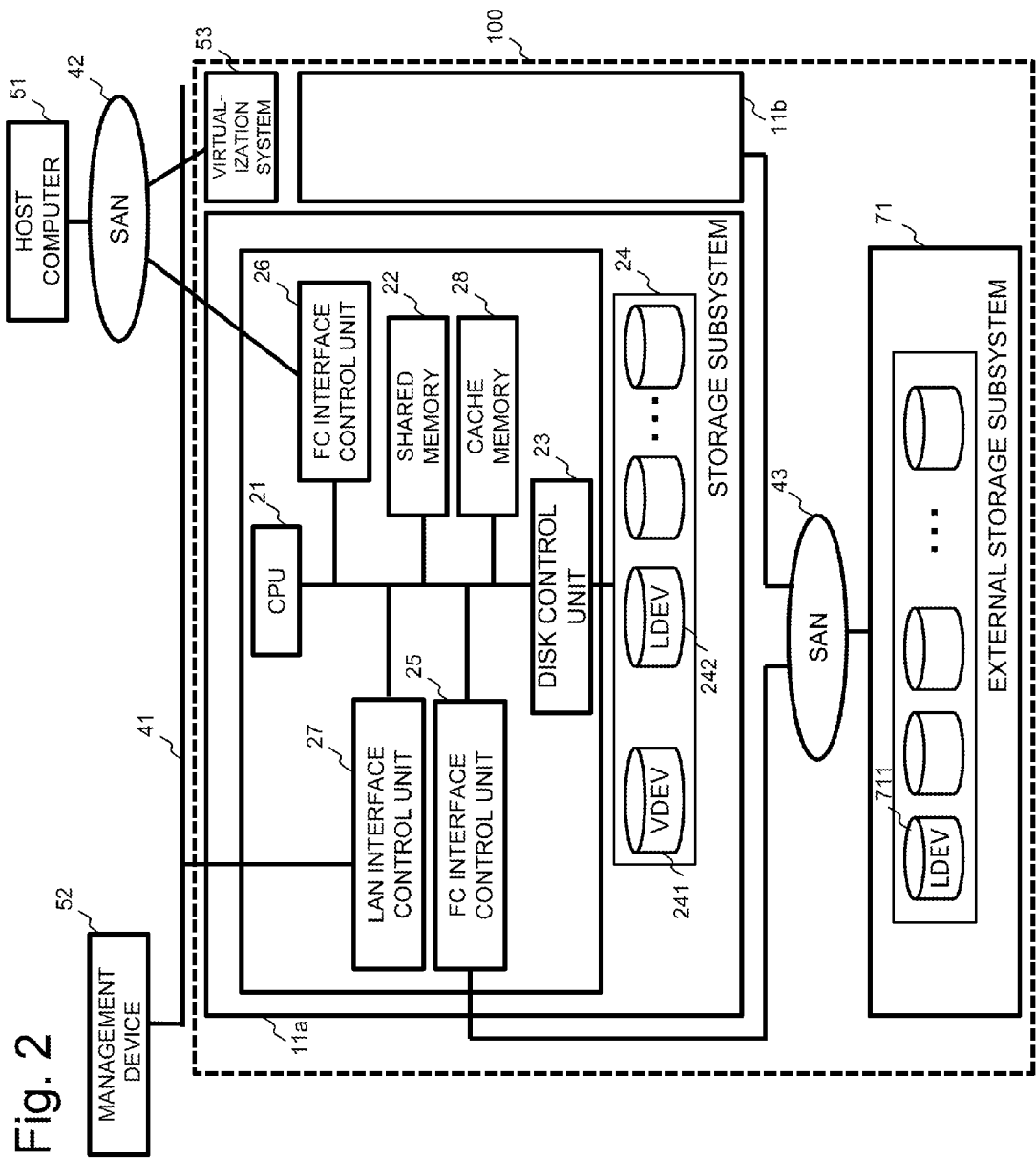
FIG. 2 is a view illustrating a hardware configuration of a storage system.

FIG. 2 illustrates a hardware configuration of a storage system. A storage system 100 includes multiple storage subsystems 11 (11a, 11b), an external storage subsystem 71, and a virtualization system 53. The storage subsystems 11 have a management device 52 connected thereto via a network 41. Further, a host computer 51 is connected via a SAN 42 to the virtualization system 53 and the storage subsystems 11. In the present example, a virtualization program (not shown) or the virtualization system 53 in the host computer 51 identifies the multiple storage subsystems 11 in the storage system 100 as a single storage subsystem. Thereby, the host computer 51 (a superior device) can access a logically single storage subsystem provided by the storage system 100. The system composed including the storage system 100 and the virtualization system 53 is called a storage network system.

The storage subsystem 11a includes a CPU 21, a shared memory 22, a disk interface control unit 23, multiple disk devices 24, an FC (Fibre Channel) interface control unit 25/26, a LAN interface control unit 27 and a cache memory 28. The storage subsystem 11b has a similar configuration as the storage subsystem 11a. The CPU 21 executes various programs stored in the shared memory 22 to realize the various control processes in the storage subsystem 11a. The cache memory 28 stores data received from the host computer 51 and the data read from the disk device 24 to the host computer 51.

The CPU 21 is connected via the disk interface control unit 23 to the disk device 24. The disk interface control unit 23 converts the logical address transmitted from the CPU 21 to a logical block address and enables access from the CPU 21 to the respective logical devices.

The disk device 24 is a storage device composed of a RAID (Redundant Array of Independent (Inexpensive) Disks) configuration composed of one or more HDDs. The access to the respective logical devices (also referred to as logical units) is executed using a logical unit number (LUN) and a logical block address (LBA).

The FC interface control unit 25 is connected to an optical fiber cable, for example, and transmission and reception of FC protocol standard-based commands and data between the storage subsystems 11 and the external storage subsystem 71 is executed via a SAN 43.

The FC interface control unit 26 has the host computer 51 connected thereto via the SAN 42 and an optical fiber cable or the like. The host computer 51 executes a business program, and writes the processed result to the storage subsystems 11, or utilizes the data stored in the storage subsystems 11. In the SAN 42/43, a communication protocol such as a fiber channel or an iSCSI is used. Further, the virtualization system 53 connects to the FC interface control unit 26 via the SAN 42.

The management device 52 is a management computer executing management of the storage system 100, such as creating a volume in the storage subsystems 11, allocating a volume to the host computer 51, and performing setup of zoning and LUN masking. The management device 52 is connected to the LAN interface control unit 27 of the storage subsystems 11 via a LAN 41, and executes transmission and reception of commands and data with the storage subsystems 11 using a TCP/IP protocol as communication protocol.

The external storage subsystem 71 is a storage system which is a device composed of a different model as the storage subsystems 11. The external storage subsystem 71 is connected to the storage subsystems 11, and managed by the storage subsystems 11. The storage subsystems 11 allocate LUs to the external volumes 711 within the external storage subsystem 71, and presents the LU to the host computer 51 as if the LUs are the disk devices 24 in the storage subsystems 11. When rending/writing data from/to the external storage subsystem 71, the host computer 51 outputs a read/write request to the LU (virtual device VDEV) virtually allocated within the storage subsystems 11. The storage subsystem 11 converts the received request to a read/write command to a corresponding LU within the external storage subsystem 71, and returns the same to the external storage subsystem 71. The external storage subsystem 71 can be composed of a device of the same model as the storage subsystems 11. As described, the storage subsystems 11 can have volumes internally logically managed as substantive volumes within the respective storage subsystems 11 or the external storage subsystem 71.

The hardware configuration of the host computer 51/management device 52/virtualization system 53/external storage subsystem 71 can have hardware resources such as a CPU, a memory, a storage device, an I/F controller and the like, similar to the storage subsystems 11.

<Software Configuration>

Figure 3:
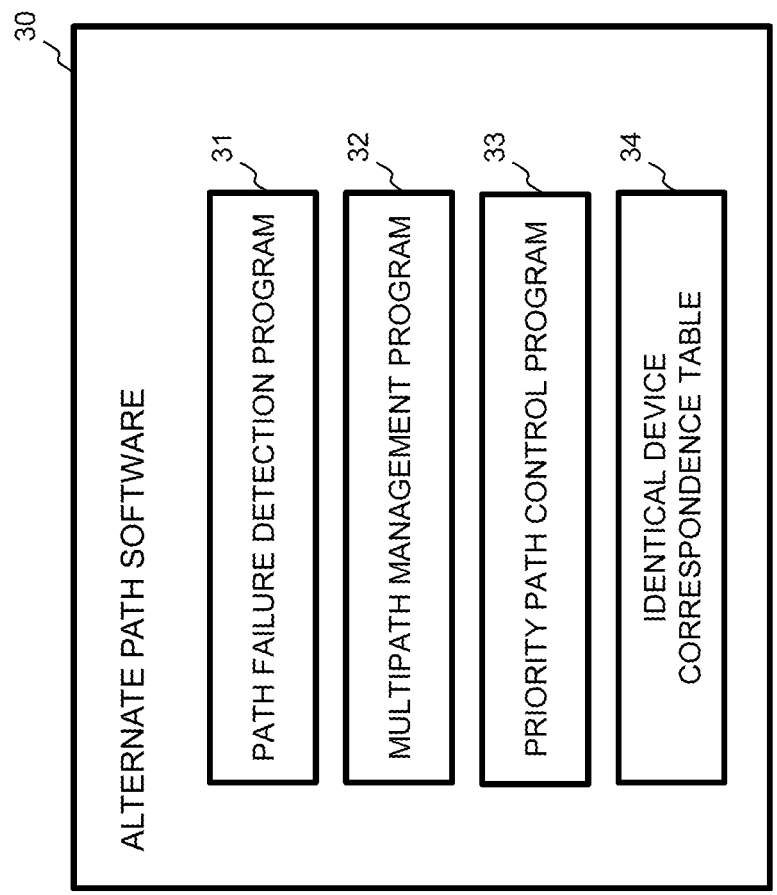
FIG. 3 is a view illustrating a configuration of an alternate path software of the host computer.

FIG. 3 is a view illustrating a configuration of an alternate path software of a host computer. An alternate path is for enhancing the reliability of a system by providing a path failover function, where a path is switched to a different path to execute I/O (Input/Output) accesses when a path fails, and to prevent stopping of accesses during failure of a path. An alternate path software 30 is a program and table for managing multiple paths to the logical volumes when the host computer 51 accesses a logical volume within the storage system 100, and for controlling which path to be used. The alternate path software 30 includes a path failure detection program 31, a multipath management program 32, a priority path control program 33, and an identical device correspondence table 34. The alternate path software 30 can be disposed within the virtualization system 53.

The path failure detection program 31 detects abnormality or failure of a path and notifies the same to the host computer 51. The multipath management program 32 performs management and control of the overall alternate path software 30. The priority path control program 33 performs control to prioritize the use of a portion of the paths by setting up a use rate for each path when a multipath is constructed in different storage subsystems 11. The identical device correspondence table 34 shows the correspondence between devices which have different paths but are substantively the same.

<Table>

FIG. 4 is a view illustrating a configuration example of an identical device correspondence table. The identical device correspondence table 34 comprises a path number 341, a LUN # 342, a storage subsystem identifier 343, and an identical device correspondence identifier 344. The identical device correspondence identifier 344 shows that it is possible to access an entity of an identical device even when the path numbers 0, 2 and 3 are of different chassis. The reason why the LUN # 342 differs between path numbers 0, 2 and 3 even though there are identical devices is that the paths are connected via different storage subsystems 11 (chassis).

FIG. 5 illustrates a drawing showing the relationship between the cache and the virtual volume in a migration source volume and a migration destination volume. I/O accesses from the host computer 51 to a virtual volume 241a of the migration source volume 29a are executed via a cache 28a. Similarly, I/O accesses from the host computer 51 to a virtual volume 241b of a migration destination volume 29b are executed via a cache 28b. The virtual volume 241a is referred to as a migration source volume (or migration source virtual volume), and the virtual volume 241b is referred to as a migration destination volume (or migration destination virtual volume).

FIG. 6 is a view illustrating a configuration example of a volume migration management table. The volume migration management table 60 is a table managing the relationship between the migration source volume 29a and the migration destination volume 29b, and the relationship between an external connection volume. The volume migration management table 60 includes a management number 601, a virtual LDEV 602, a migration source LUN 603, a migration source storage subsystem connection path information 604, an external connection storage subsystem 605, an external device LUN 606, an external storage subsystem connection path information 607, and an external storage subsystem path status 608.

The virtual LDEV 602 is information for uniquely specifying a virtual LDEV within the migration source storage subsystem. The migration source LUN 603 denotes a LUN allocated to the virtual LDEV 602. The migration source storage subsystem connection path information 604 shows information on the connection path between the migration source storage subsystem 11a and the migration destination storage subsystem 11b. The external connection storage subsystem 605 shows information on the external storage subsystem 71 connected to the migration source storage subsystem 11a.

The external storage subsystem LUN 606 illustrates the LUN information in the external storage subsystem 71 recognized by the migration source storage subsystem 11a. The external storage subsystem connection path information 607 shows the information on the connection path between the migration destination storage subsystem 11b and the external storage subsystem 71. The external storage subsystem path status 608 shows the status (offline/online) of the connection path between the migration destination storage subsystem 11b and the external storage subsystem 71. The volume where the entry from the external connection storage subsystem 605 to the external storage subsystem path status 608 is blank is a volume not associated with the external storage subsystem 71.

<<Data Migration Embodiment>>

Figure 7:
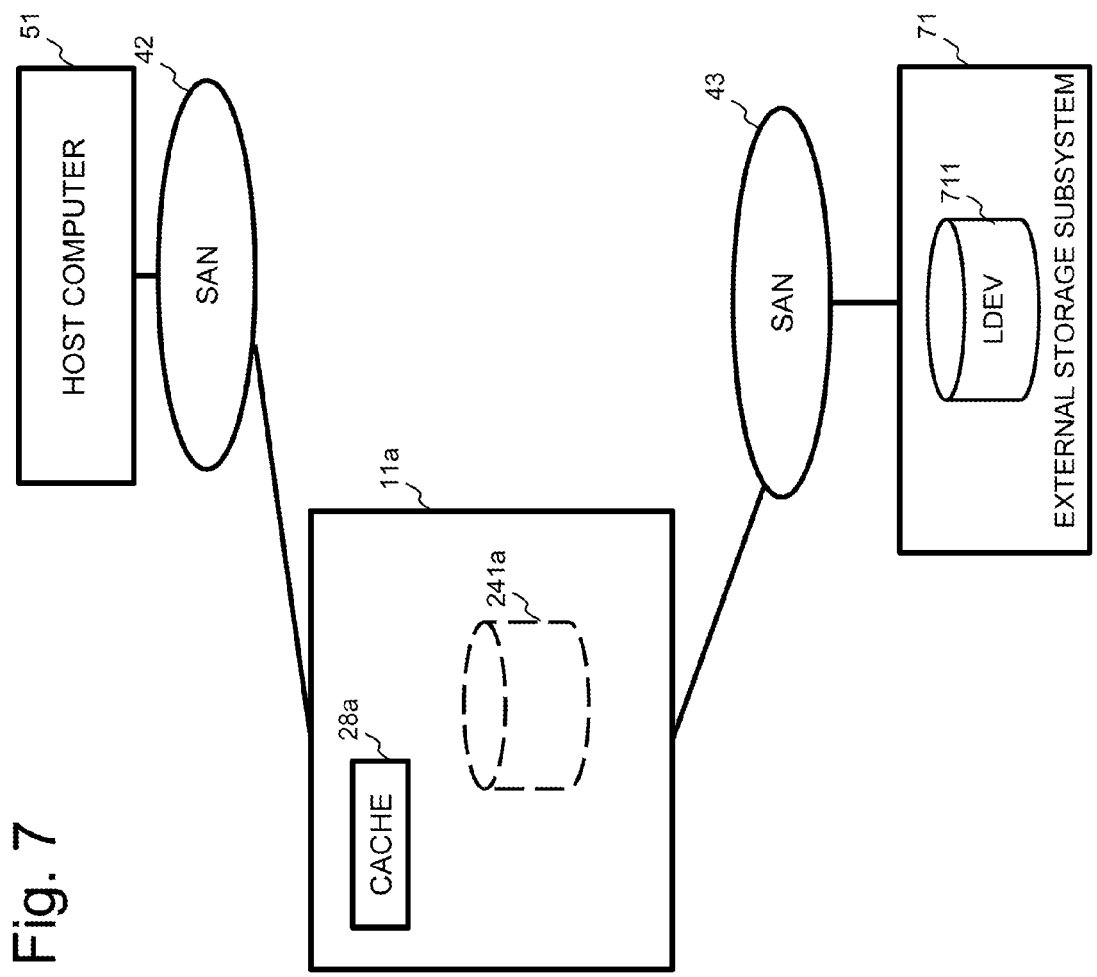
FIG. 7 is a view illustrating a data migration environment.

FIG. 7 is a view illustrating a data migration environment. In the present embodiment, as an assumption, the external volume 711 (LDEV (real volume)) of the external storage subsystem 71 is defined by the host computer 51 as a virtual volume 241a to the migration source storage subsystem 11a. The virtual volume 241a is defined in a port (not shown) connected to the host computer 51. This state is illustrated in FIG. 7. As mentioned earlier, a volume 241a of the external storage subsystem 71 defined as a virtual volume to the migration source storage subsystem 11a is called a migration source volume 241a.

<Migration Source Volume Definition Process>

Figure 8:
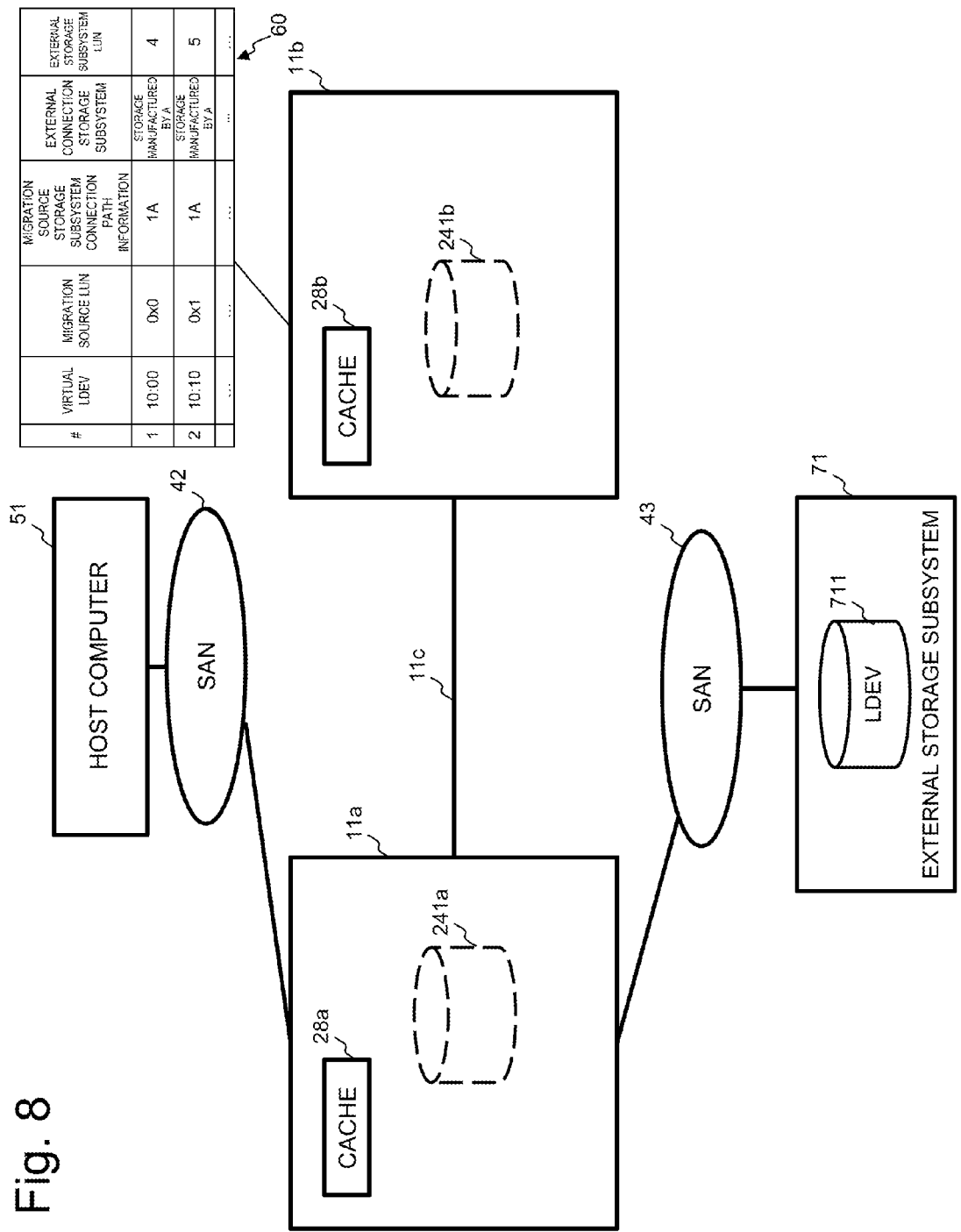
FIG. 8 is a view illustrating a migration source volume definition in a migration destination storage subsystem.
Figure 9:
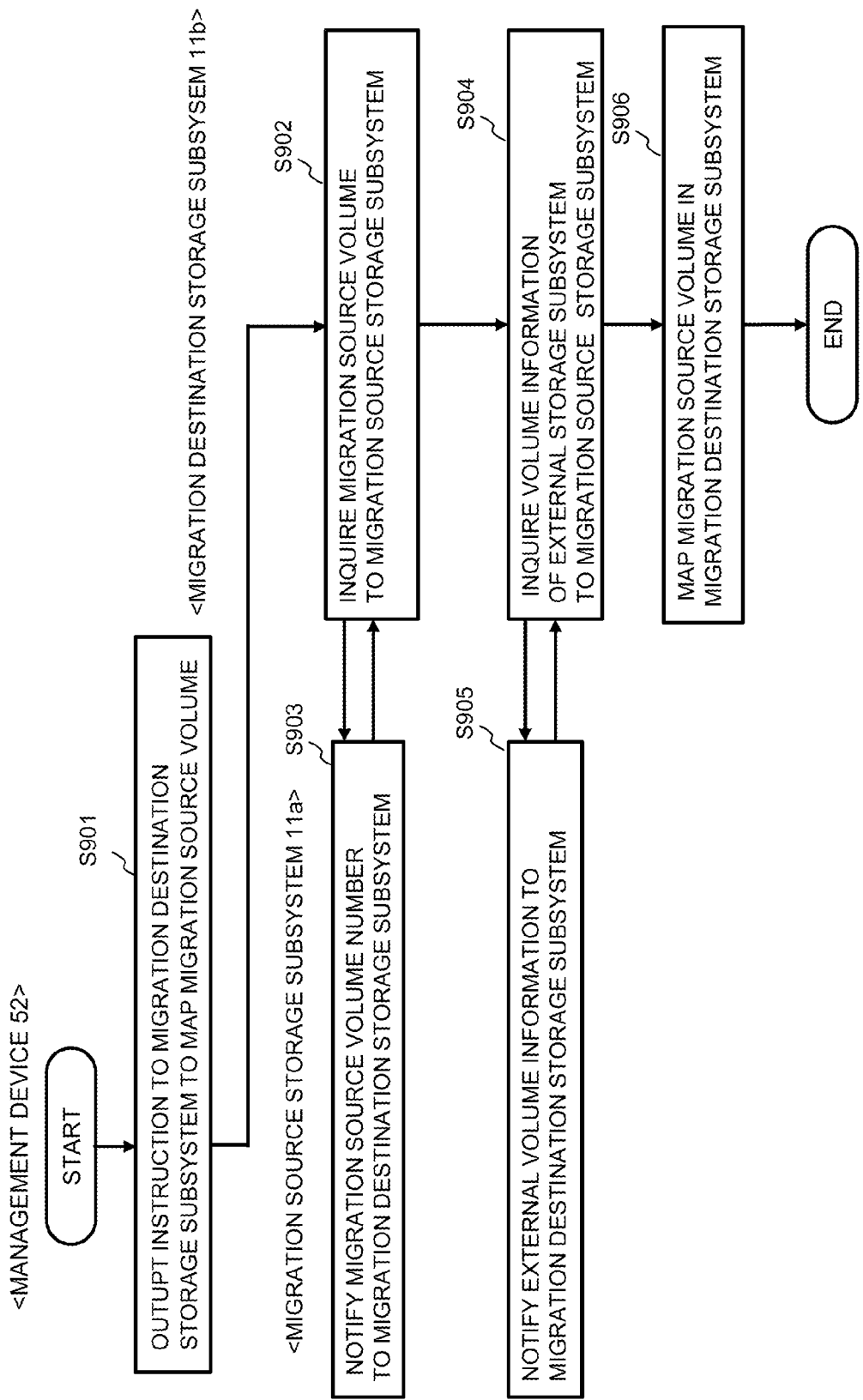
FIG. 9 is a flowchart illustrating a migration source volume definition process in a migration destination storage subsystem.

FIG. 8 is a view illustrating a migration source volume definition in a migration destination storage subsystem. FIG. 9 is a flowchart showing the migration source volume definition process in a migration destination storage subsystem. In the following description, the respective subsystems are set as the subject of the processes, but the CPU of the respective subsystems, or a control program operating in the CPU can also be the subject.

Next, as shown in FIG. 8, the migration destination storage subsystem 11b and the migration source storage subsystem 11a are physically connected using a dedicated line 11c. That is, one or more ports of the respective storage subsystems are used for connection via an optical fiber cable and the like.

In S901 of FIG. 9, an instruction to map a migration source volume 241a to the migration destination storage subsystem 11b is output from the management device 52. In S902, the migration destination storage subsystem 11b having received the mapping instruction inquires the migration source storage subsystem 11a on the information of the migration source volume 241a. In S903, the migration source storage subsystem 11a notifies a migration source volume number to the migration destination storage subsystem 11b.

In S904, the migration destination storage subsystem 11b inquires the migration source storage subsystem 11a on the information of an external volume which is the entity of the migration source volume 241a. In S905, the migration source storage subsystem 11a notifies an external volume information to the migration destination storage subsystem 11b. In S906, the migration destination storage subsystem 11b maps the migration source volume 241a as a virtual volume based on the notified external volume information, and sets the same as the migration destination volume 241b.

By the above operation, the acquired information is stored in the respective entries of the management number 601, the virtual LDEV 602, the migration source LUN 603, the migration source storage subsystem connection path information 604, the external connection storage subsystem 605 and the external storage subsystem LUN 606 of the volume migration management table 60. In this state, the I/O from the host computer 51 is executed to the storage subsystem 11a via the virtualization system 53.

<External Volume Definition/Connection Processing to Host Computer>

Figure 10:
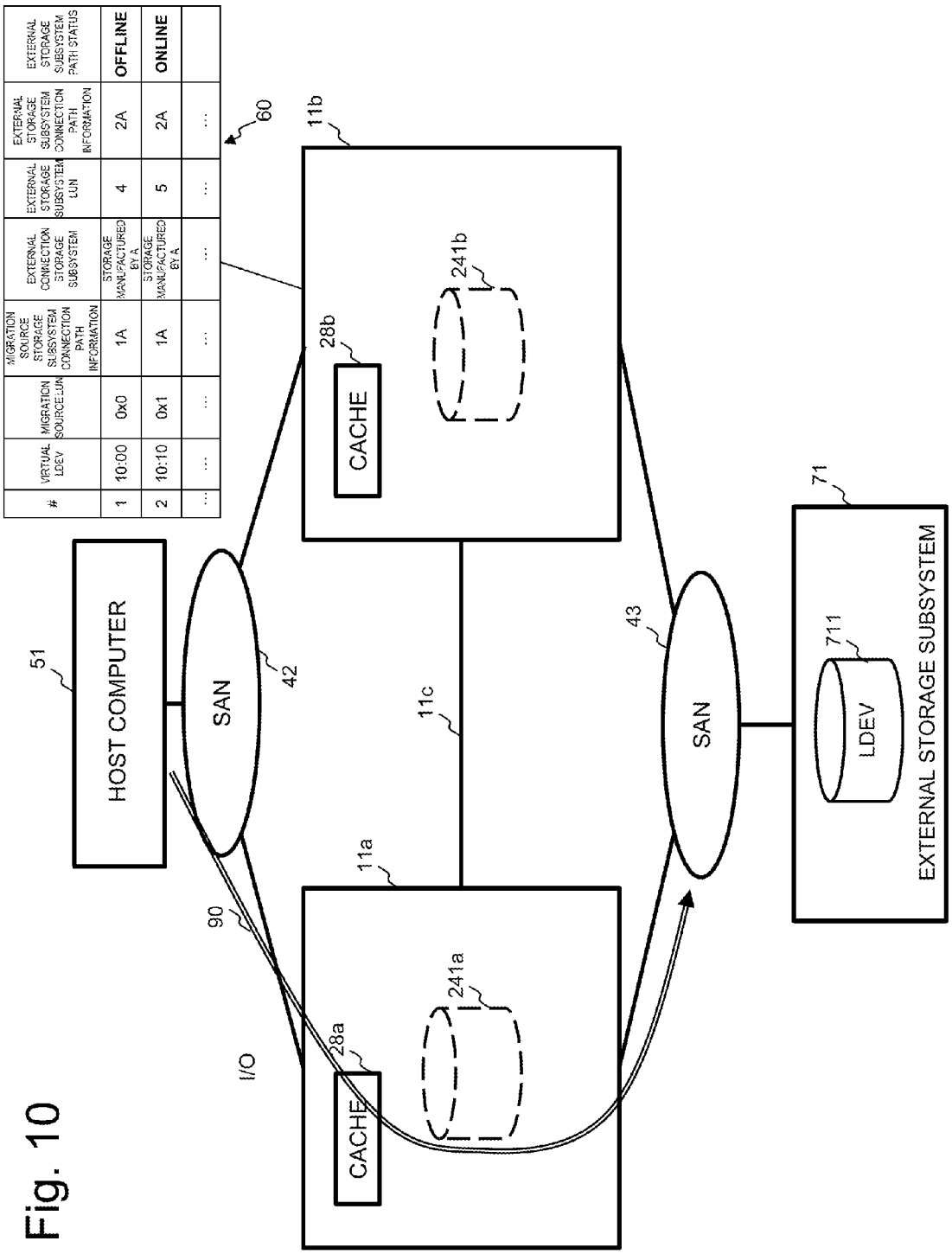
FIG. 10 is a view illustrating the definition of external volume in the migration destination storage subsystem and the connection to a host computer.
Figure 11:
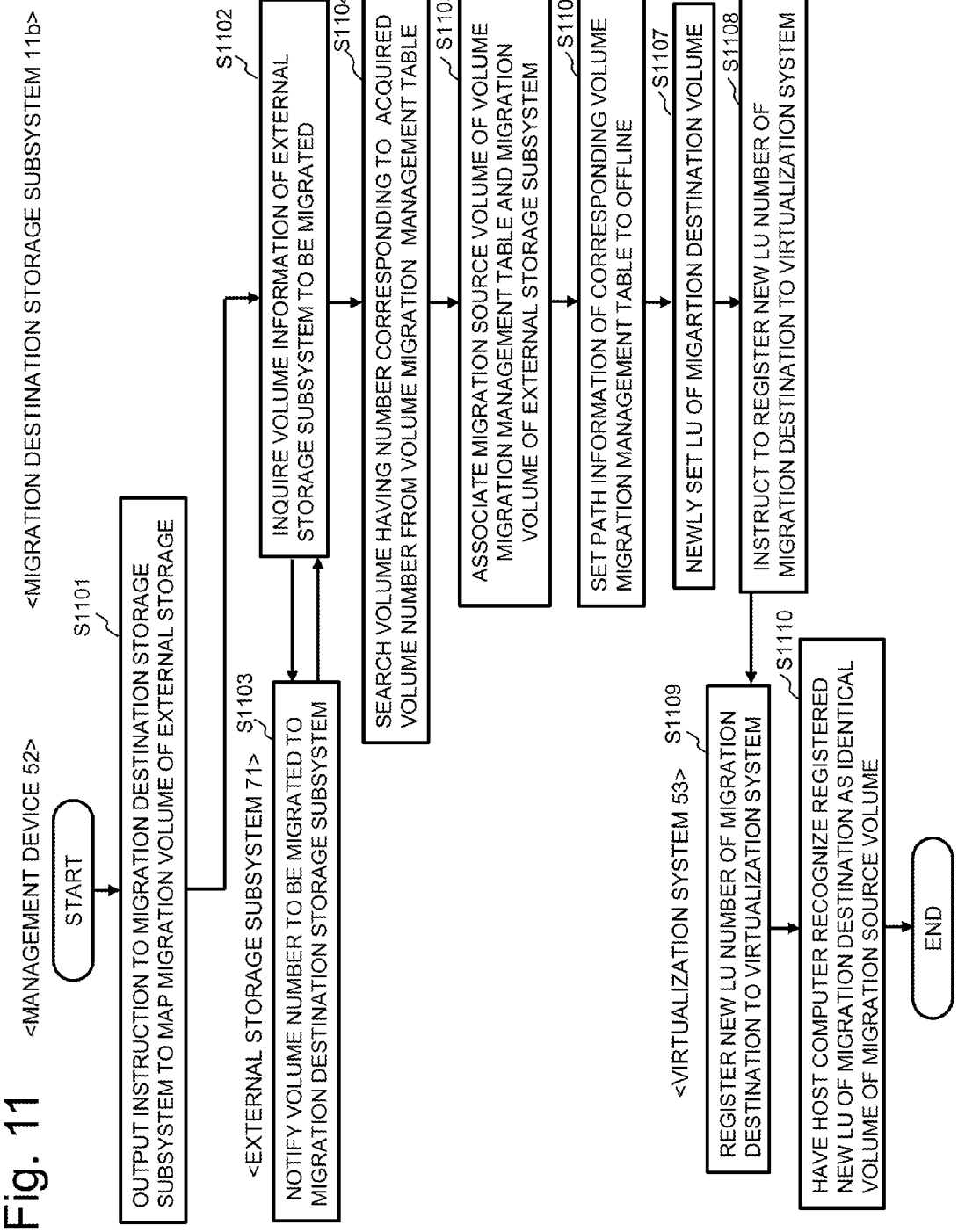
FIG. 11 is a flowchart, illustrating a process for defining the external volume in the migration destination storage subsystem and a process for connecting the same to the host computer.

FIG. 10 is a view illustrating an external volume definition in a migration destination storage subsystem, and the connection to the host computer. FIG. 11 illustrates a flowchart showing the external volume definition processing in a migration destination storage subsystem and the connection processing to the host computer.

At first, as shown in FIG. 10, the connection between the migration destination storage subsystem 11b, the host computer 51 and the external storage subsystem 71 is realized. That is, the external storage subsystem 71 and the migration destination storage subsystem 11b are physically connected via an optical fiber cable and the like.

In S1101 of FIG. 11, an instruction to map a migration volume of the external storage subsystem 71 is output from the management device 52 to the migration destination storage subsystem 11b. In S1102, the migration destination storage subsystem 11b sends an inquiry of migration volume information to the external storage subsystem 71. In S1103, the external storage subsystem 71 notifies a volume number to be migrated to the migration destination storage subsystem 11b. In other words, the external storage subsystem 71 notifies the information (number) of the volumes (logical devices) provided to the migration source storage subsystem 11a.

In S1104, the migration destination storage subsystem 11b searches a volume having a number that corresponds to the volume number acquired from the external storage subsystem 71 in the volume migration management table 60. In S1105, the migration destination storage subsystem 11b associates the migration source volume in the volume migration management table 60 with the external volume 711 of the external storage subsystem 71, and updates the volume migration management table 60.

In S1106, the migration destination storage subsystem 11b sets the external storage subsystem path status 608 in the volume migration management table corresponding to the volume having the corresponding volume number to "offline". In S1107, the migration destination storage subsystem 11b newly sets an LU of the migration destination volume in the volume migration management table 60.

In S1108, the migration destination storage subsystem 11b instructs the virtualization system 53 to register a new LU number of the migration destination volume. In S1109, the virtualization system 53 registers the new LU number of the migration destination volume to the management information within the subsystem. In S1110, the virtualization system 53 has the host computer 51 recognize the LU of the registered migration destination volume as an identical volume as the migration source volume 241a. Further, it is possible to have the host computer 51 execute the processes of S1109 and S1110 as a virtualization program (not shown), and to have the new LU number registered and to have the volume recognized as the identical volume.

<<Data Migration Preparation>>
<Flow of I/O Processing>

Figure 12:
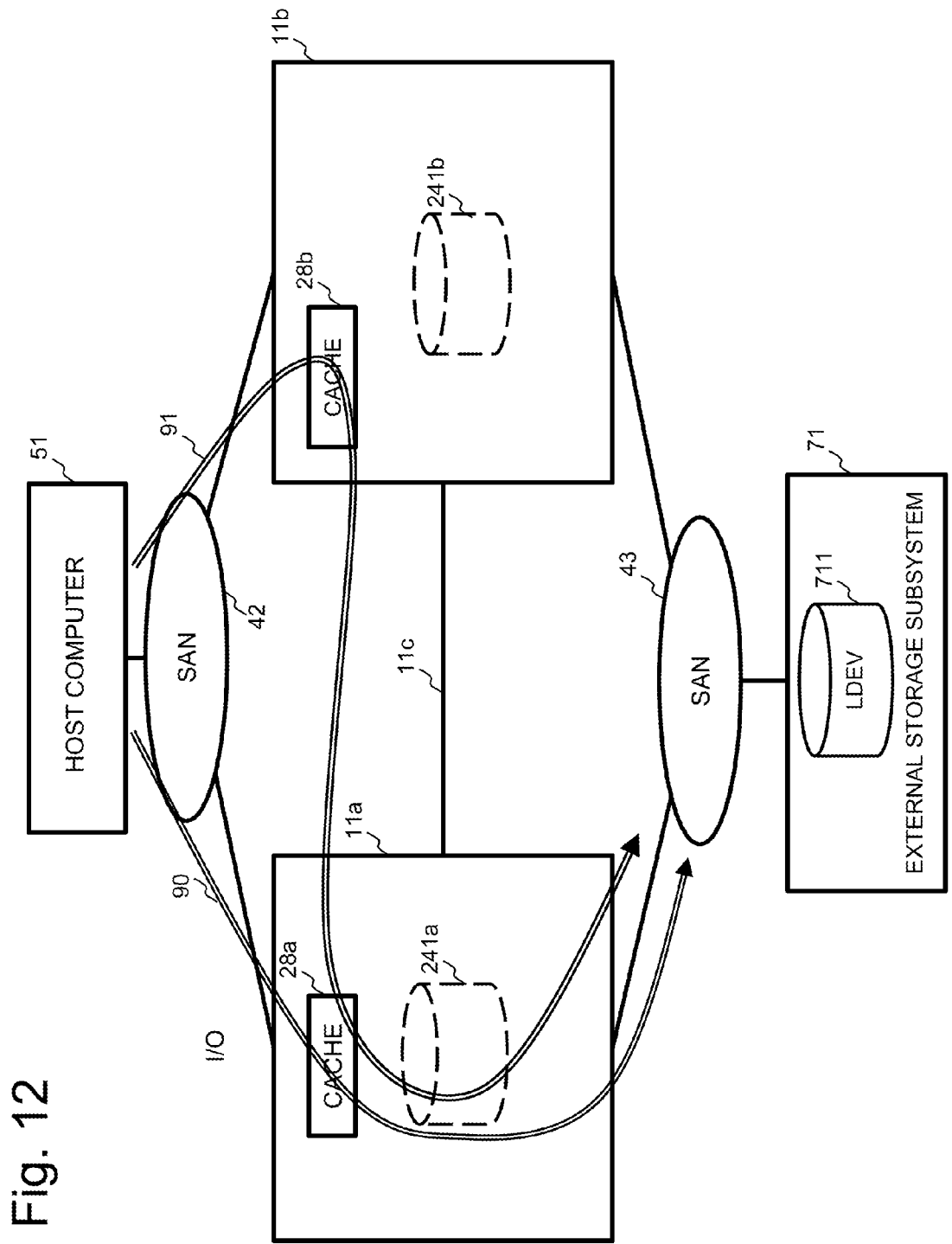
FIG. 12 is a view illustrating a flow of I/O processing from the host computer.

FIG. 12 is a view illustrating a flow of I/O processing from the host computer. During data migration, the cache memory 28a of the migration source storage subsystem 11a and the cache memory 28b of the migration destination storage subsystem 11b are constantly duplexed, and identical data is stored therein.

<Writing of Data>

Figure 13:
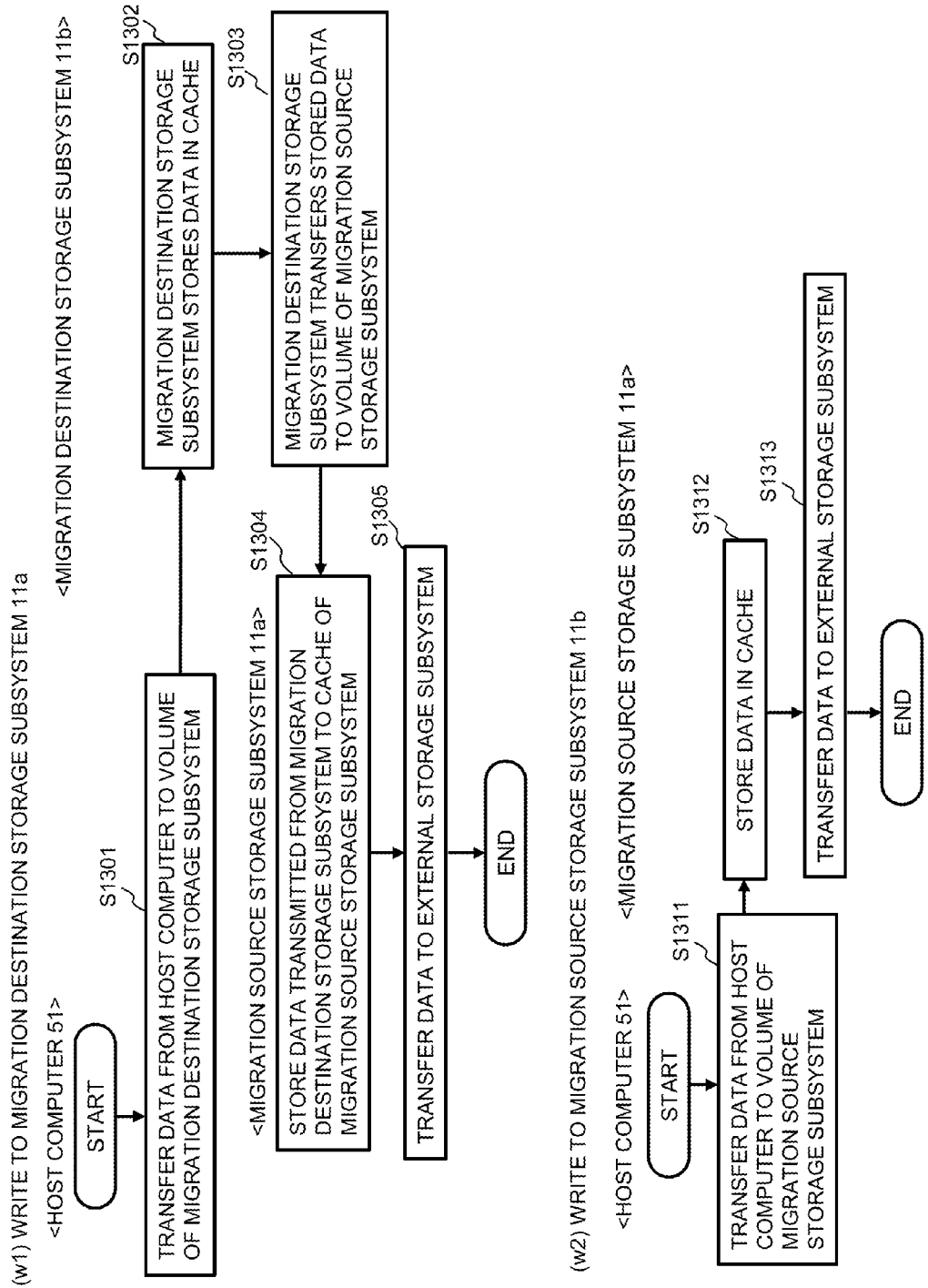
FIG. 13 is a flowchart illustrating the writing of data from the host computer to the migration destination storage subsystem and the migration source storage subsystem.

FIG. 13 is a flowchart illustrating the process to write data to the migration destination storage subsystem and the migration source storage subsystem from the host computer.

(w1) Write to Migration Destination Storage Subsystem 11b (Reference Number 91 of FIG. 12)

In S1301, the host computer 51 transfers data to the volume (migration destination volume 241b) of the migration destination storage subsystem 11b. In S1302, the migration destination storage subsystem 11b stores data from the host computer 51 to the cache memory 28b. In S1303, the migration destination storage subsystem 11b transfers the data stored in the cache memory 28b to a volume of the migration source storage subsystem 11a (migration source volume 241a). In S1304, the data transmitted from the migration destination storage subsystem 11b is stored in the cache memory 28a of the migration source storage subsystem 11a. In S1305, the migration source storage subsystem 11a transfers the data stored in the cache memory 28a to the external storage subsystem 71. Then, the external storage subsystem 71 stores the transferred data to a given external volume 711.

(w2) Write to Migration Source Storage Subsystem 11a (Reference Number 90 of FIG. 12)

In S1311, the host computer 51 transfers data to a volume of the migration source storage subsystem 11a (migration source volume 241a). In S1312, the migration source storage subsystem 11a stores data from the host computer 51 to the cache memory 28a. In S1313, the migration source storage subsystem 11a transfers data to the external storage subsystem 71. Then, the external storage subsystem 71 stores the transferred data to a given external volume 711.

<Data Readout>

Figure 14:
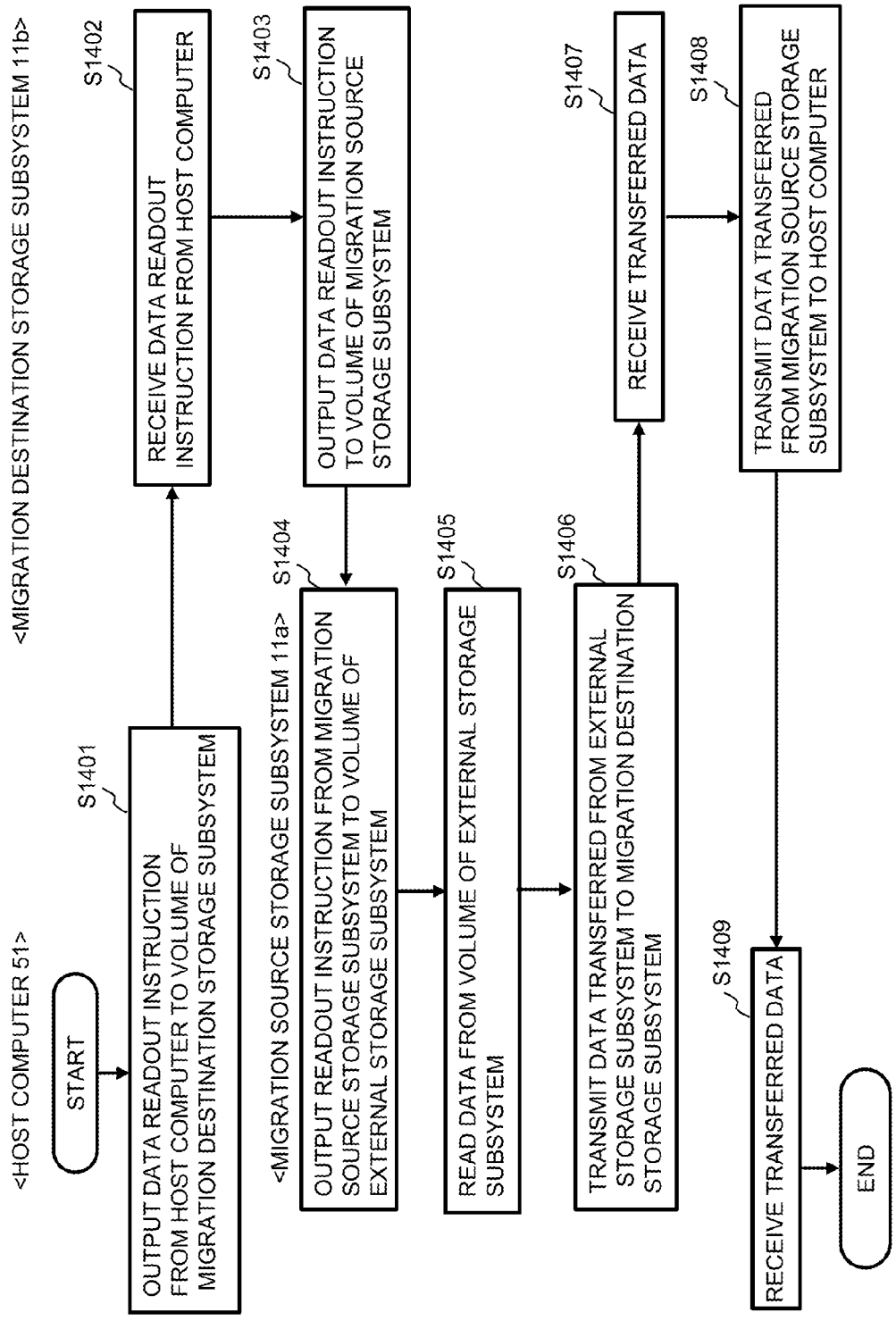
FIG. 14 is a flowchart illustrating a data readout processing from the host computer to the migration destination storage subsystem.
Figure 15:
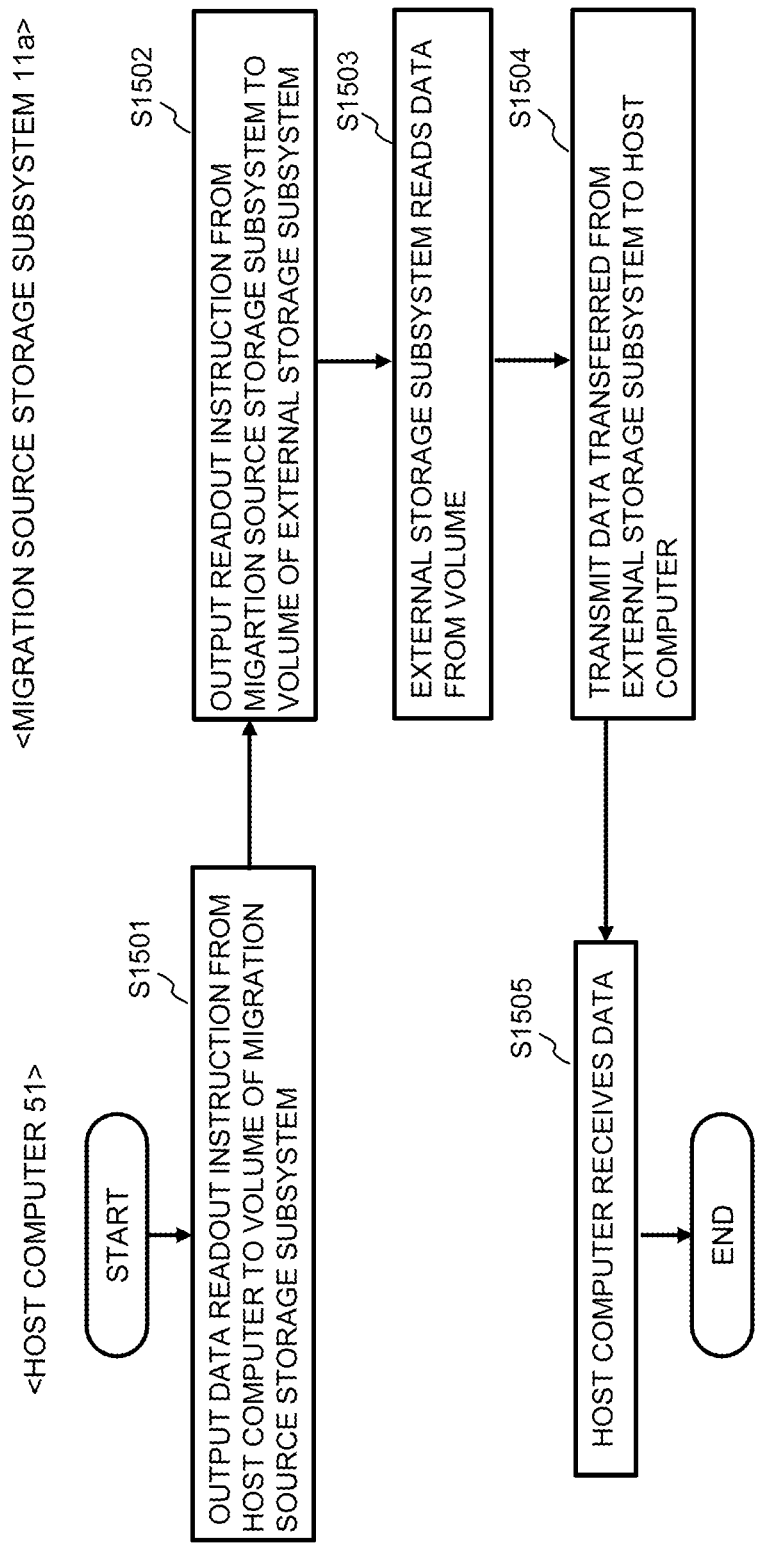
FIG. 15 is a flowchart illustrating a data readout processing from the host computer to the migration source storage subsystem.

FIG. 14 and FIG. 15 are flowcharts illustrating a data readout processing from the host computer to the migration destination storage subsystem. FIG. 14 shows a data readout processing from the host computer 51 to the migration destination storage subsystem 11b, and FIG. 15 illustrates a data readout processing from the host computer 51 to the migration source storage subsystem 11a.

In S1401, a data readout instruction of a volume (migration destination volume 241b) is output from the host computer 51 to the migration destination storage subsystem 11b. In S1402, the migration destination storage subsystem 11b receives a data readout instruction from the host computer 51. In S1403, the migration destination storage subsystem 11b outputs a data readout instruction from the volume (migration source volume 241a) to the migration source storage subsystem 11a. In S1404, a readout instruction is output from the migration source storage subsystem 11a to the external volume 711 of the external storage subsystem 71. In S1405, the external storage subsystem 71 reads a predetermined data from the external volume 711. In S1406, the migration source storage subsystem 11a transfers the data transmitted from the external storage subsystem 71 to the migration destination storage subsystem 11b. In S1407, the migration destination storage subsystem 11b receives the data transferred from the migration source storage subsystem 11a. In S1408, the migration destination storage subsystem 11b transfers the data transmitted from the migration source storage subsystem 11a to the host computer 51. In S1409, the host computer 51 receives data from the migration destination storage subsystem 11b, and completes the readout process.

In S1501, the host computer 51 outputs a data readout instruction to the migration source volume 241a of the migration source storage subsystem 11a. In S1502, the migration source storage subsystem 11a having received the readout instruction outputs a readout instruction to the external volume 711 of the external storage subsystem 71. In S1503, the external storage subsystem 71 reads the data corresponding to the readout instruction from the external volume 711. Then, the external storage subsystem 71 transfers the readout data to the migration source storage subsystem 11a.

In S1504, the migration source storage subsystem 11a transfers the data transmitted from the external storage subsystem 71 to the host computer 51. In S1505, the host computer 51 receives the data from the migration source storage subsystem 11a.

<<Execution of Data Migration>>
<Cache Purge/Reserve Allocation>

Figure 16:
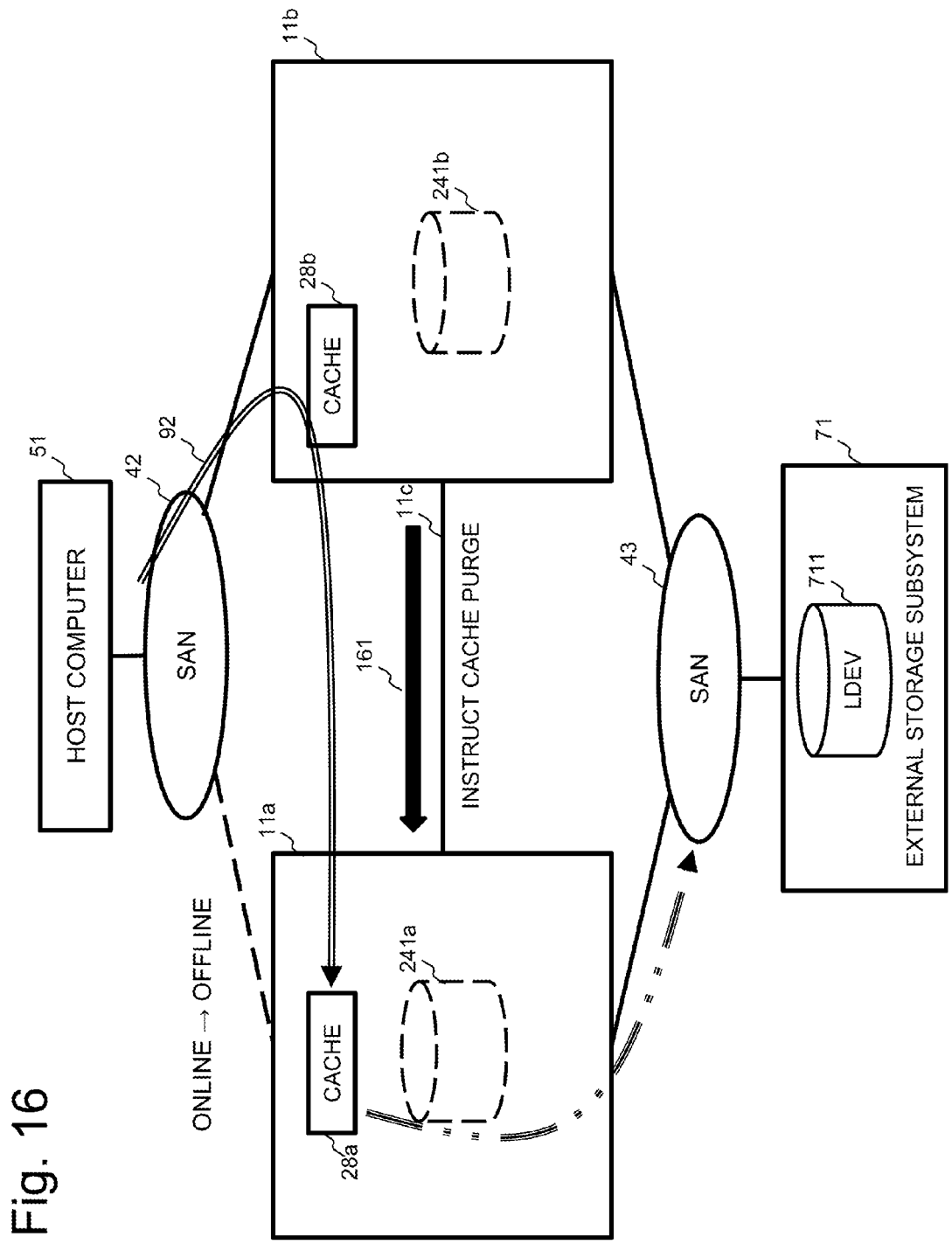
FIG. 16 is a view illustrating a cache purge instruction to the migration source storage subsystem.
Figure 17:
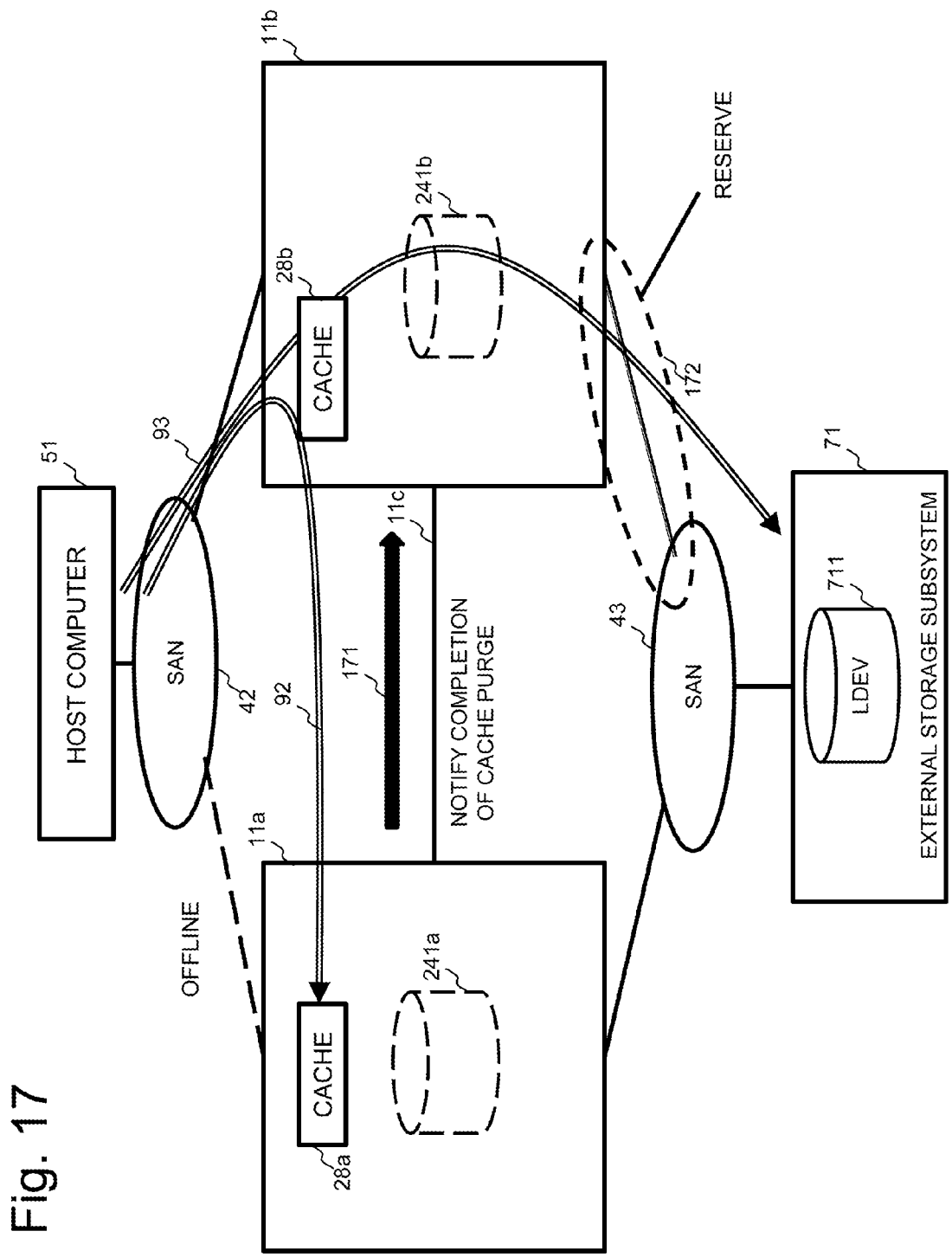
FIG. 17 is a view illustrating the completion of cache purge and reserve allocation to the external storage subsystem.
Figure 18:
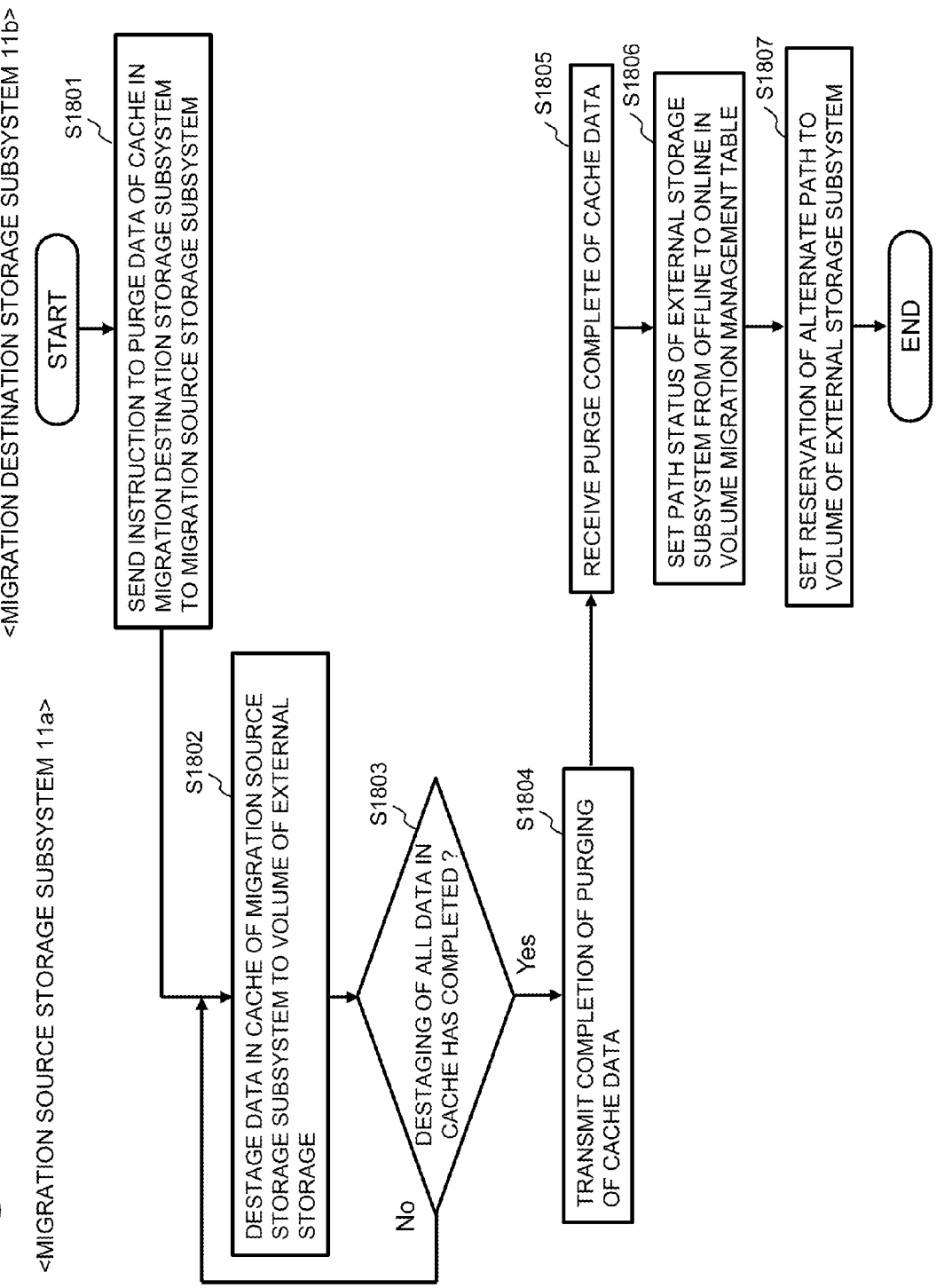
FIG. 18 is a flowchart illustrating a cache purge processing and a reserve allocation processing.

FIG. 16 is a view illustrating a cache purge instruction to the migration source storage subsystem. FIG. 17 is a view illustrating completion of cache purge and reserve allocation to the external storage subsystem. FIG. 18 is a flowchart illustrating a cache purge processing and reserve allocation processing. A cache purge is a process for storing the content of a cache memory 28 which is a volatile memory to a disk device 24 as a nonvolatile storage device or an external storage subsystem 71, deleting the data and initializing the memory. Further, a reserve allocation allows I/O access only through a specific path when there are multiple access paths to a specific device (such as an external storage subsystem 71).

At first, the multipath management program 32 of the alternate path software 30 managed by the host computer 51 sets the path connecting the host computer 51 and the migration source storage subsystem 11a from online to offline.

In S1801, the management device 52 transmits an instruction to purge the data in the cache memory 28a of the migration source storage subsystem 11a via the migration destination storage subsystem 11b (Reference number 161 of FIG. 16). In S1802, the data in the cache memory 28a of the migration source storage subsystem 11a is destaged (subjected to data storage) to the external volume 711 of the external storage subsystem 71. In S1803, the migration source storage subsystem 11a determines whether destaging of all the data of the cache memory 28a has been completed or not. If destaging is not completed (No), the migration source storage subsystem 11a continues destaging, and if destaging is completed (Yes), S1804 is executed.

In S1804, the migration source storage subsystem 11a transmits a data purge completion notice of the cache memory 28a (Reference number 171 of FIG. 17). In S1805, the migration destination storage subsystem 11b receives a data purge completion notice of the cache memory 28a. In S1806, the migration destination storage subsystem 11b sets the path status 608 of the external storage subsystem of the volume migration management table 60 from offline to online.

In S1807, the migration destination storage subsystem 11b sets a reservation of alternate path to the external volume 711 of the external storage subsystem 71. Based on this reserve setting, I/O accesses from the migration source storage subsystem 11a to the external storage subsystem 71 cannot be executed. Therefore, it becomes possible to prevent unexpected data transmission from the migration source storage subsystem 11a to the external storage subsystem 71 from damaging the data stored in the external volume 711 of the external storage subsystem 71.

<Data Write During Migration>

Figure 19:
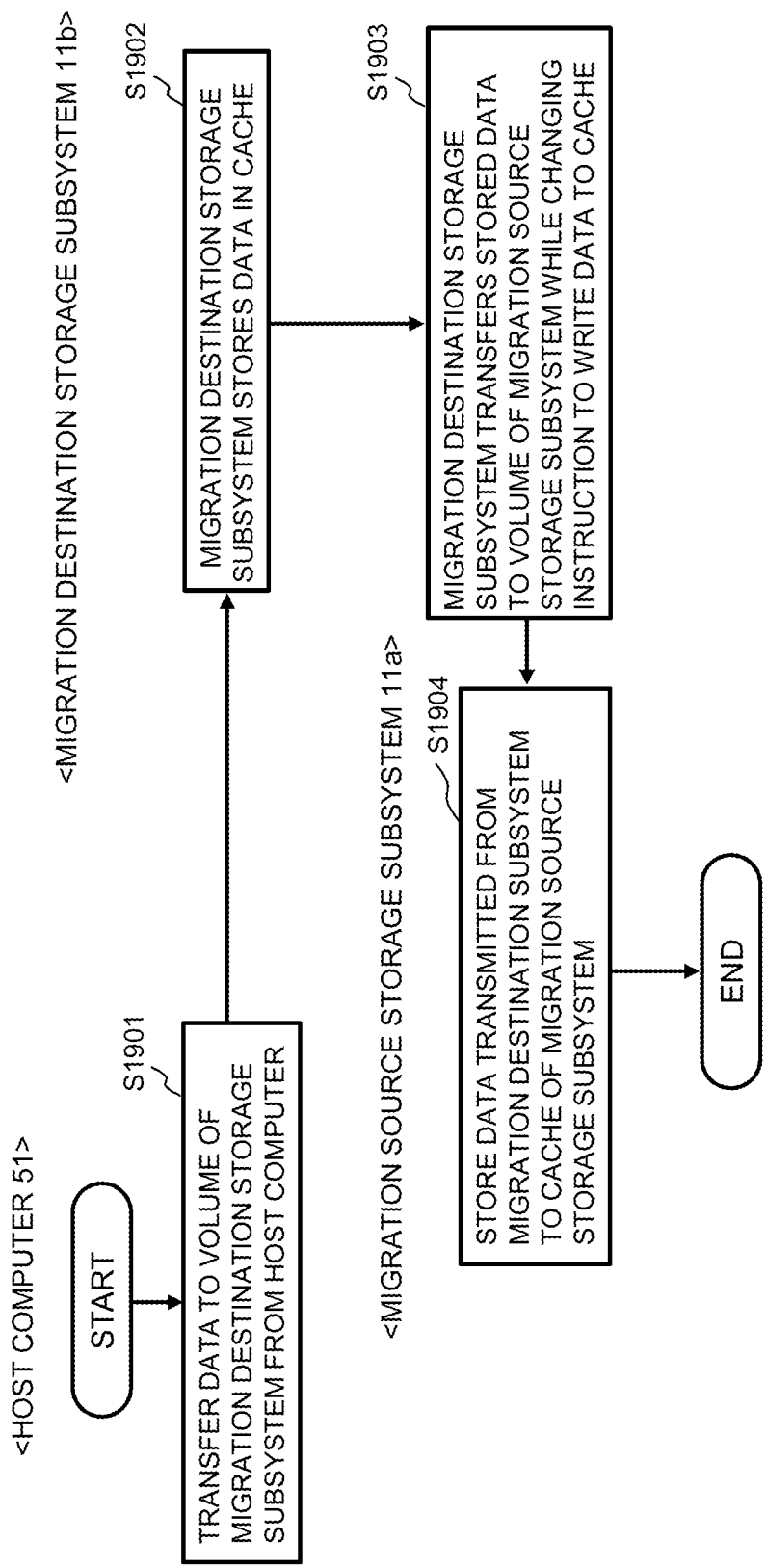
FIG. 19 is a flowchart illustrating a data transfer processing from the host computer to the migration destination storage subsystem during data migration.

FIG. 19 is a flowchart illustrating a data write processing from the host computer to the migration destination storage subsystem during data migration. In S1901, data is transferred from the host computer 51 to the volume 241b of the migration destination storage subsystem 11b. In S1902, the migration destination storage subsystem 11b stores data in the cache memory 28b. In S1903, the migration destination storage subsystem 11b changes the instruction to merely write the data stored in the cache memory 28b in the cache of the volume of the migration source storage subsystem 11a, and transfers the data. In S1904, the migration source storage subsystem 11a stores the data transmitted from the migration destination storage subsystem 11b to the cache memory 28a.

During data migration, as shown in S1901 through S1904, the writing of identical data from the host computer 51 to the external storage subsystem 71 is performed to the cache memory 28b of the migration destination storage subsystem 11b and the cache memory 28a of the migration source storage subsystem 11a. Thereby, identical write data can be retained in the cache memory 28b and the cache memory 28a. During data readout, the migration source storage subsystem 11a of FIG. 15 should be read as migration destination storage subsystem 11b, and the migration destination storage subsystem 11b reads data from the external storage subsystem 71 and transfers the same to the host computer 51.

Further, the migration source volume 241a and the migration destination volume 241b can be recognized as identical from the host computer 51 via a volume mapping process of S1101 through S1106 and the registration of a new LU number of the migration destination volume via the processes of S1107 through S1110. In addition, through the process of writing data from the host computer 51 that has occurred during data migration, the write data is reflected in the cache memory 28b and the external storage subsystem 71.

As described, the configuration of the external storage subsystem 71 provided to the host computer 51 can be migrated without stopping the I/O accesses from the host computer 51. The data copying process from the external storage subsystem 71 to the migration destination storage subsystem 11b and the data copying process from the migration destination storage subsystem 11b to the external storage subsystem 71 become unnecessary, and the migration time can be cut down.

<Flow of I/O After Completion of Migration>

Figure 20:
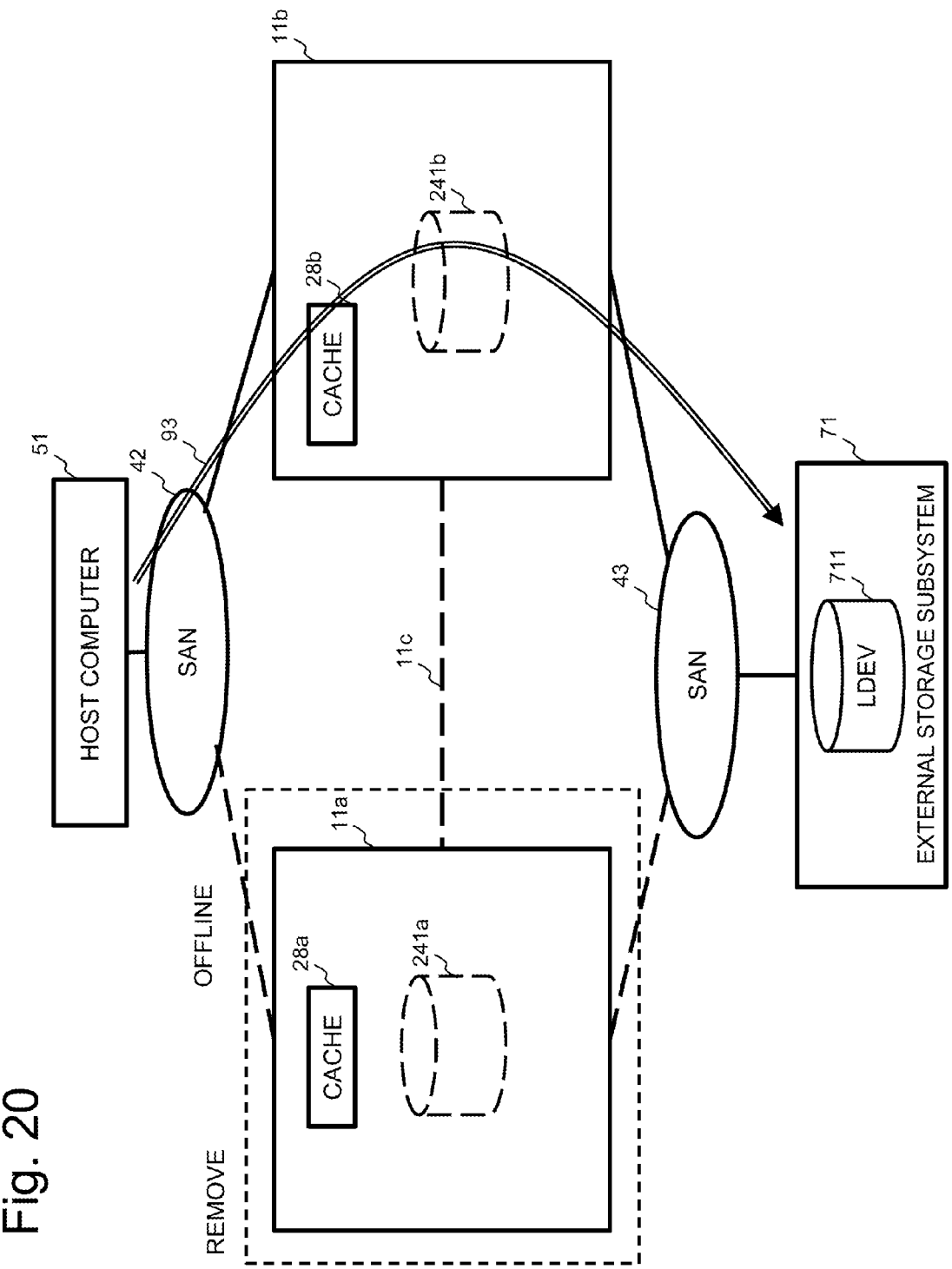
FIG. 20 is a view illustrating the flow of I/O from the host computer to the migration destination storage subsystem during data migration.

FIG. 20 illustrates a flow of I/O from the host computer to the migration destination storage subsystem. When data migration of all volumes including the logical volume created in the migration source storage subsystem 11a has been completed, the management device 52 disconnects the connection between the migration source storage subsystem 11a and the migration destination storage subsystem 11b, and the connection between the migration source storage subsystem 11a and the external storage subsystem 71. After disconnection has been completed, the migration source storage subsystem 11a, which is the old model, is removed. The I/O accesses from the host computer 51 to the virtual volume 241b will be executed via the cache memory 28b of the migration source storage subsystem 11a, which is the new model, to the external volume 711 of the external storage subsystem 71.

<Removal Process>

Figure 21:
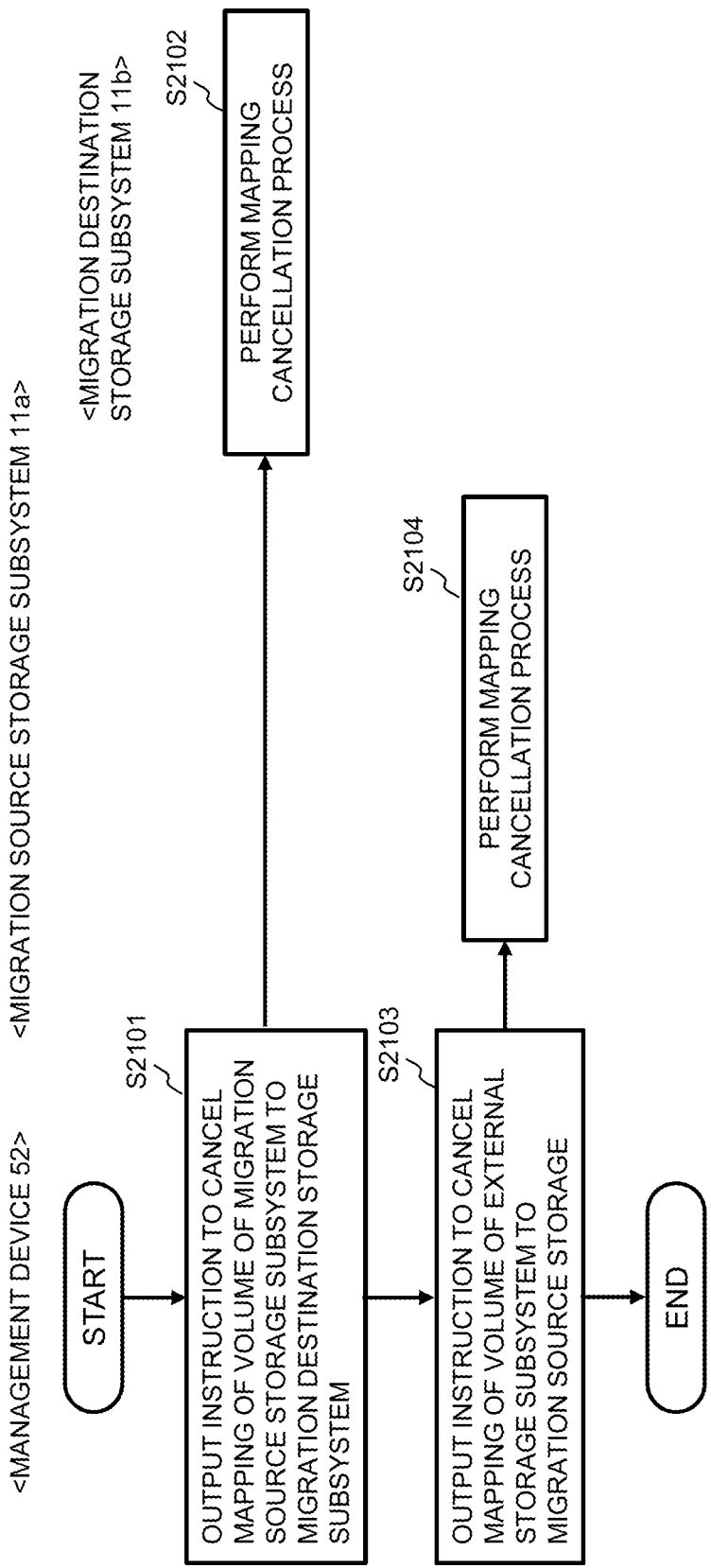
FIG. 21 is a flowchart illustrating a removal process of the migration source storage subsystem.

FIG. 21 is a flowchart illustrating a process for removing a migration source storage subsystem. In S2101, the management device 52 outputs an instruction to cancel mapping of volume 241b of the migration source storage subsystem 11a to the migration destination storage subsystem 11b. In S2102, the migration destination storage subsystem 11b performs a mapping cancellation process of volume 241b. In S2103, the management device 52 outputs an instruction to cancel mapping of the external volume 711 of the external storage subsystem 71 to the migration source storage subsystem 11a. In S2104, the migration source storage subsystem 11a performs a mapping cancellation process of the external volume 711 of the external storage subsystem 71. After completing the mapping cancellation process, the aforementioned disconnection is performed to enable removal of the migration source storage subsystem 11a, which is the old model.

Embodiment 2

Figure 22:
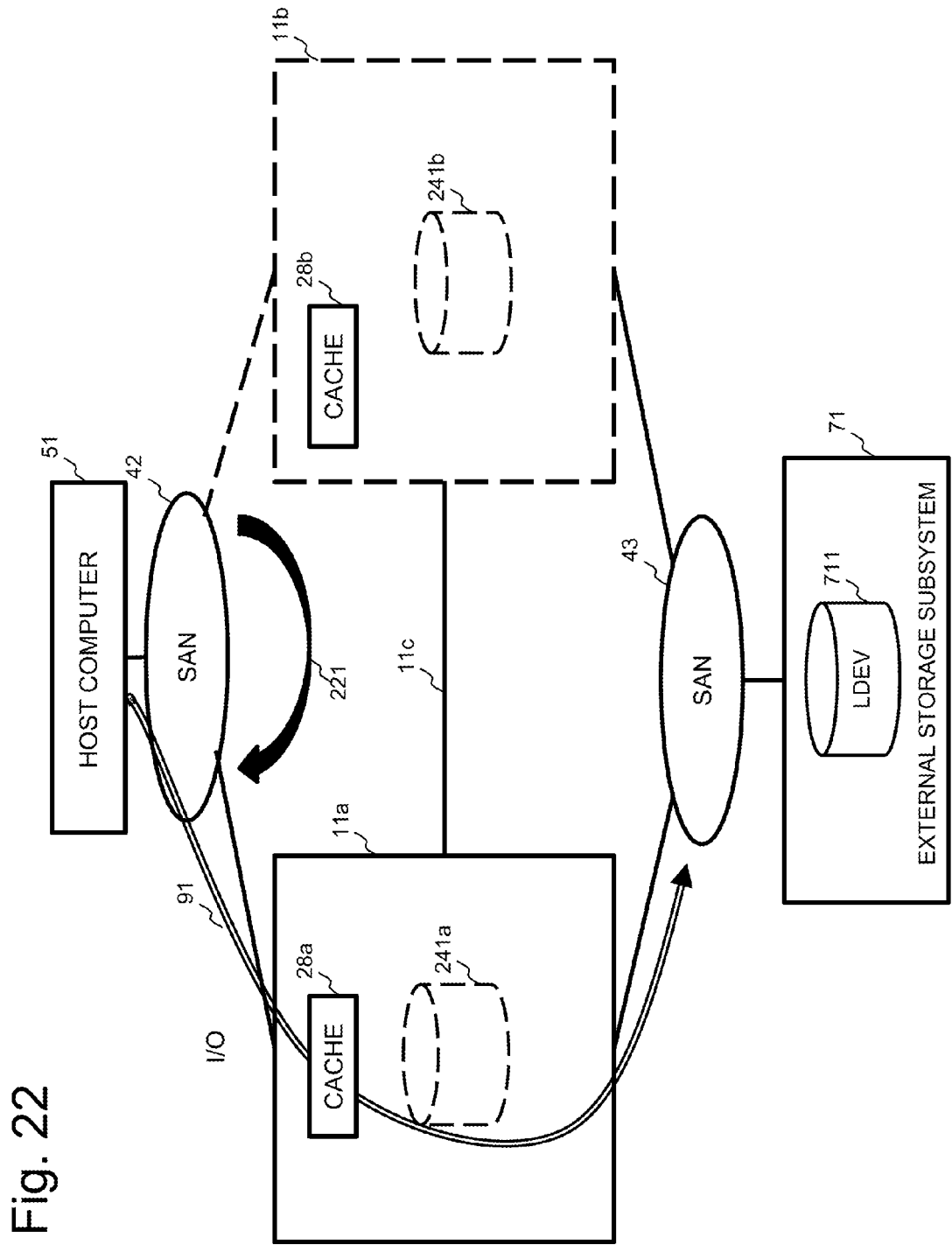
FIG. 22 is a view illustrating the operation to change configuration when failure occurs to the migration destination storage subsystem.
Figure 23:
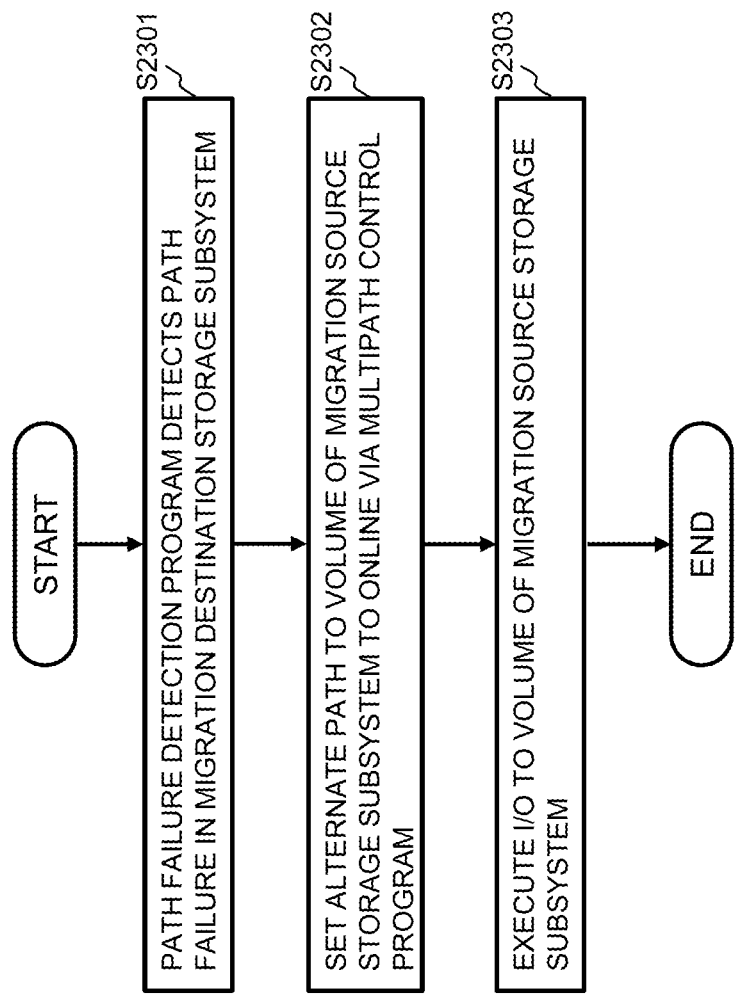
FIG. 23 is a flowchart illustrating a configuration change processing when failure occurs in the migration destination storage subsystem.

As a second embodiment, an operation and processing for returning a migration destination storage subsystem 11b to the original system configuration before migration when failure occurs in the migration destination storage subsystem 11b during data migration will be described with reference to FIGS. 22 and 23. FIG. 22 is a view illustrating a configuration change operation when failure occurs in the migration destination storage subsystem. FIG. 23 is a flowchart showing the configuration change processing performed when failure occurs in the migration destination storage subsystem.

As shown in FIG. 22, when failure occurs in the migration destination storage subsystem 11b, the path between the host computer 51 and the storage subsystems 11 is changed from the connection between the host computer 51 and the migration destination storage subsystem 11b to the connection between the host computer 51 and the migration source storage subsystem 11a, as shown by reference number 221, and the I/O access processing from the host computer 51 to the storage subsystems 11 is continued.

In S2301, the path failure detection program 31 of the host computer 51 detects path failure in the migration destination storage subsystem 11b. In S2302, the multipath management program 32 of the host computer 51 uses the identical device correspondence table 34 and the volume migration management table 60 to set the alternate path leading to the volume 241a of the migration source storage subsystem 11a to online. Then, the multipath management program 32 updates the external storage subsystem path status 608 of the volume migration management table 60. In S2303, the host computer 51 executes the I/O to the volume 241a of the migration source storage subsystem 11a.

As described, when the host computer 51 detects path failure in the migration destination storage subsystem 11b, it switches the connection path to the alternate path connecting to the migration source storage subsystem 11a using the connection information between the host computer 51 and the migration source storage subsystem 11a and the connection information between the migration source storage subsystem 11a and the external storage subsystem 71, to thereby continue the I/O accesses to the volume (external storage subsystem 71) using the migration source storage subsystem 11a.

The present invention is not restricted to the above-illustrated preferred embodiments, and can include various modifications. The above-illustrated embodiments are described in detail to help understand the present invention, and the present invention is not restricted to the structure including all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective function. The information such as the programs, tables and files for realizing the respective functions can be stored in a storage device such as a memory, a hard disk or an SSD (Solid State Drive), or in a memory media such as an IC card, an SD card or a DVD. Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST 11a, 11b: Storage subsystem
21: CPU
28: Cache memory
31: Path failure detection program
34: Identical device correspondence table
51: Host computer
52: Management device
53: Virtualization system
60: Volume migration management table
71: External storage subsystem
100: Storage system
711: LDEV (External volume)

The invention claimed is:

1. A storage system comprising a migration source storage subsystem, a migration destination storage subsystem and an external storage subsystem, wherein:
the storage system has a host computer and a management device connected thereto;
the migration source storage subsystem includes a migration source cache memory, which is associated with an external volume composed of a storage device of an external storage subsystem and provided virtually to the host computer as a migration source volume;
the migration destination storage subsystem includes a migration destination cache memory;
wherein based on a data migration instruction output by the management device from the migration source storage subsystem to the migration destination storage subsystem;
the storage system:
associates and allocates the migration source volume to the migration destination storage subsystem as a migration destination volume;
associates the migration destination volume to the external volume and virtually provides the same to the host computer;
based on a purge command to the migration source cache memory, deletes stored data after reflecting the stored data in the external volume;
after completing the purge command, restricts the access from the host computer to the external volume to pass through the migration destination storage;
when a data write command is output from the host computer to the migration destination volume, stores a write data in the migration destination cache memory and the external volume, and also transfers the same to the migration source cache memory for storage therein; and
performs data migration of a system configuration in the migration source storage subsystem to a system configuration in the migration destination storage subsystem.

2. The storage system according to claim 1, wherein the allocation in which the migration source volume is associated with the migration destination storage subsystem as migration destination volume is performed by acquiring an information on the migration source volume, and an association information of the migration source volume and the external volume.

3. The storage system according to claim 1, wherein
in order to associate the migration destination volume with the external volume and virtually provide the same to the host computer;
the migration destination volume is associated with the external volume based on the information on the migration source volume associated with the external volume, and the connection between the migration destination volume and the external volume is set to a cancelled state.

4. The storage system according to claim 1, wherein regarding an IO access from the host computer output before the purge command is issued;
if the IO access is a data write command to the migration destination storage subsystem, write data is stored in a migration destination cache memory and the write data is transferred to the migration source storage subsystem, and the write data is stored in the migration source cache memory and the external volume;
if the IO access is a data readout command from the migration destination storage subsystem, the migration destination storage subsystem transfers the data readout command to the migration source storage subsystem, and the migration source storage subsystem reads data corresponding to the data readout command from the external volume, and transfers the same to the host computer.

5. The storage system according to claim 1, wherein limiting of access from the host computer to the external volume to a path passing the migration destination storage is performed by:
cancelling a path connection between the host computer and the migration source storage subsystem, and providing one or more connection paths permitting IO access from the host computer between the migration destination storage subsystem and the external storage subsystem.

6. The storage system according to claim 1, wherein after completing the data migration, the association between the migration source volume of the migration source storage subsystem and the migration destination volume of the migration destination storage subsystem, and the association between the migration source volume and the external volume of the external storage subsystem, are cancelled.

7. The store system according to claim 1, wherein when failure of the migration destination storage subsystem is detected during data migration by an IO access from the host computer, a path connection in cancelled state between the host computer and the migration source storage subsystem is reconnected and the IO access is continued.

8. A method for migrating a storage system comprising a migration source storage subsystem, a migration destination storage subsystem and an external storage subsystem, wherein:

the storage system has a host computer and a management device connected thereto;

the migration source storage subsystem includes a migration source cache memory, which is associated with an external volume composed of a storage device of an external storage subsystem and provided virtually to the host computer as a migration source volume;

the migration destination storage subsystem includes a migration destination cache memory;

wherein based on a data migration instruction output by the management device from the migration source storage subsystem to the migration destination storage subsystem;

the method:

associates and allocates the migration source volume to the migration destination storage subsystem as a migration destination volume;

associates the migration destination volume to the external volume and virtually provides the same to the host computer;

based on a purge command to the migration source cache memory, deletes stored data after reflecting the stored data in the external volume;

after completing the purge command, restricts the access from the host computer to the external volume to pass through the migration destination storage;

when a data write command is output from the host computer to the migration destination volume, stores a write data in the migration destination cache memory and the external volume, and also transfers the same to the migration source cache memory for storage therein; and performs data migration of a system configuration in the migration source storage subsystem to a system configuration in the migration destination storage subsystem.

9. The method for migrating a storage system according to claim 8, wherein the allocation in which the migration source volume is associated with the migration destination storage subsystem as migration destination volume is performed by acquiring an information on the migration source volume, and an association information of the migration source volume and the external volume.

10. The method for migrating a storage system according to claim 8, wherein
in order to associate the migration destination volume with the external volume and virtually provide the same to the host computer;
the migration destination volume is associated with the external volume based on the information on the migration source volume associated with the external volume, and the connection between the migration destination volume and the external volume is set to a cancelled state.

11. The method for migrating a storage system according to claim 8, wherein regarding an IO access from the host computer output before the purge command is issued;
if the IO access is a data write command to the migration destination storage subsystem, write data is stored in a migration destination cache memory and the write data is transferred to the migration source storage subsystem, and the write data is stored in the migration source cache memory and the external volume;
if the IO access is a data readout command from the migration destination storage subsystem, the migration destination storage subsystem transfers the data readout command to the migration source storage subsystem, and the migration source storage subsystem reads data corresponding to the data readout command from the external volume, and transfers the same to the host computer.

12. The method for migrating a storage system according to claim 8, wherein
limiting of access from the host computer to the external volume to a path passing the migration destination storage is performed by:
cancelling a path connection between the host computer and the migration source storage subsystem, and providing one or more connection paths permitting IO access from the host computer between the migration destination storage subsystem and the external storage subsystem.

13. The method for migrating as storage system according to claim 8, wherein
after completing the data migration, the association between the migration source volume of the migration source storage subsystem and the migration destination volume of the migration destination storage subsystem, and the association between the migration source volume and the external volume of the external storage subsystem, are cancelled.

14. The method for migrating a store system according to claim 8, wherein
when failure of the migration destination storage subsystem is detected during data migration by an IO access from the host computer, a path connection in cancelled state between the host computer and the migration source storage subsystem is reconnected and the IO access is continued.

* * * * *